US011422372B2

(12) United States Patent
Yamaguchi et al.

(10) Patent No.: US 11,422,372 B2
(45) Date of Patent: Aug. 23, 2022

(54) DISTANCE MEASUREMENT DEVICE, HEAD-MOUNTED DISPLAY DEVICE, MOBILE INFORMATION TERMINAL, IMAGE DISPLAY DEVICE, SURROUNDINGS MONITORING SYSTEM, AND DISTANCE MEASUREMENT METHOD

(71) Applicant: MAXELL, LTD., Kyoto (JP)

(72) Inventors: Keita Yamaguchi, Tokyo (JP); Toshiki Ishii, Tokyo (JP)

(73) Assignee: MAXELL, LTD., Kyoto (JP)

( * ) Notice: Subject to any disclaimer, the term of this patent is extended or adjusted under 35 U.S.C. 154(b) by 293 days.

(21) Appl. No.: 16/492,094

(22) PCT Filed: Mar. 8, 2017

(86) PCT No.: PCT/JP2017/009306
§ 371 (c)(1),
(2) Date: Sep. 6, 2019

(87) PCT Pub. No.: WO2018/163335
PCT Pub. Date: Sep. 13, 2018

(65) Prior Publication Data
US 2021/0132382 A1 May 6, 2021

(51) Int. Cl.
*G02B 27/01* (2006.01)
*G01S 17/931* (2020.01)
(Continued)

(52) U.S. Cl.
CPC ........ *G02B 27/0172* (2013.01); *G01S 17/931* (2020.01); *G02B 27/283* (2013.01); *G02B 27/40* (2013.01)

(58) Field of Classification Search
CPC .. G02B 27/0172; G02B 27/283; G02B 27/40; G02B 7/34; G02B 5/1876; G02B 7/36;
(Continued)

(56) References Cited

U.S. PATENT DOCUMENTS 4,758,070 A 7/1988 Nishimoto
2007/0177153 A1* 8/2007 Takahashi ............ G01B 11/303
356/479

(Continued)

FOREIGN PATENT DOCUMENTS

JP S61-277919 A 12/1986
JP 2010-016743 A 1/2010
(Continued)

OTHER PUBLICATIONS

International Search Report issued in corresponding International Patent Application No. PCT/JP2017/009306, dated Jun. 6, 2017, with English translation.

*Primary Examiner* — Muhammad N Edun
(74) *Attorney, Agent, or Firm* — McDermott Will & Emery LLP

(57) ABSTRACT

A distance measurement device includes an imaging optical system, an imaging device, and a distance measurement section which measures based on a plurality of images captured by the imaging device, a distance from the imaging device to the target to be imaged. The imaging optical system includes a polarization beam splitting section which splits a first polarization beam having a first polarization direction and a second polarization beam having a second polarization direction substantially orthogonal to the first polarization direction and allows the polarization beam splitting section to be incident on the imaging device. The imaging device receives the first polarization beam to capture a first polarization image and the second polarization beam to capture a second polarization image. The distance measurement section measures the distance to the target to be imaged on the basis of the first polarization image and the second polarization image.

18 Claims, 17 Drawing Sheets

(51) Int. Cl.
*G02B 27/28* (2006.01)
*G02B 27/40* (2006.01)

(58) Field of Classification Search
CPC ......... G02B 7/28; G02B 27/285; G01S 7/499; G01S 17/931; G01S 7/4816; G01S 17/894; G01C 3/06; H04N 7/18
See application file for complete search history.

(56) References Cited

U.S. PATENT DOCUMENTS

| | | | |
|---|---|---|---|
| 2014/0009583 A1 | 1/2014 | Suzuki et al. | |
| 2015/0043783 A1 | 2/2015 | Ishihara | |
| 2015/0062399 A1 | 3/2015 | Ishihara | |
| 2015/0381871 A1* | 12/2015 | Makino | G02B 27/286 348/335 |
| 2016/0238380 A1* | 8/2016 | Hatada | G01B 11/0608 |

FOREIGN PATENT DOCUMENTS

| | | |
|---|---|---|
| JP | 2013-108990 A | 6/2013 |
| JP | 2013-205516 A | 10/2013 |
| JP | 2014-013146 A | 1/2014 |
| JP | 2015-034732 A | 2/2015 |
| JP | 2015-46777 A | 3/2015 |
| WO | 2016/208215 A1 | 12/2016 |

\* cited by examiner

DISTANCE MEASUREMENT DEVICE, HEAD-MOUNTED DISPLAY DEVICE, MOBILE INFORMATION TERMINAL, IMAGE DISPLAY DEVICE, SURROUNDINGS MONITORING SYSTEM, AND DISTANCE MEASUREMENT METHOD

CROSS-REFERENCE TO RELATED APPLICATIONS

This application is the U.S. National Phase under 35 U.S.C. § 371 of International Application No. PCT/JP2017/009306, filed on Mar. 8, 2017, of which the entire content is hereby incorporated by reference.

TECHNICAL FIELD

The present invention relates to a distance measurement device, a head-mounted display device, a mobile information terminal, an image display device, surroundings monitoring system, and a distance measurement method.

BACKGROUND ART

As a distance measurement technique which needs no light source, there has been known a passive distance measurement device typified by a lens focal method of performing distance measurement on the basis of focus blur, or a stereo method of performing distance measurement on the basis of the disparity among a plurality of imaging devices. As an example thereof, there has been described in Patent Literature 1 that "a multi-focus camera of the preset invention includes a lens of an imaging optical system, a first imaging device which out of light incident from a subject through the lens, absorbs the light at a predetermined absorption rate by an organic photoelectric conversion film and photoelectrically converts it to capture an image of a subject, a second imaging device which photoelectrically convers the light transmitted through the first imaging device to capture an image of the subject, and a control section which controls an imaging operation by the first imaging device and the second imaging device. The control section has a distance measurement calculation section which calculates a distance from the subject to the lens on the basis of the difference in blur amount between the images of the subject captured by the first imaging device and the second imaging device (summary abstract)".

CITATION LIST

Patent Literature

PTL 1: Japanese Patent Application Laid-Open No. 2013-205516

SUMMARY OF INVENTION

Technical Problem

The multi-focus camera disclosed in Patent Literature 1 has realized simultaneous imaging of a plurality of images necessary for the lens focal method by disposing a plurality of imaging devices spaced apart from each other along the optical axis of the lens. Therefore, there is an actual situation that there are restrictions on miniaturization of the multi-focus camera due to the need to secure the distance between the first imaging device and the second imaging device.

Therefore, the present invention aims to provide a distance measurement technique which further reduces constraints on a size reduction.

Solution to Problem

The above problem is solved by the invention described in the scope of claims, for example. As an example thereof, there is provided a distance measurement device measuring, based on a plurality of images, a distance to a target to be imaged captured into the corresponding images, which includes an imaging optical system, an imaging device which images incident light from the imaging optical system, and a distance measurement section which measures the distance from the imaging device to the target to be imaged on the basis of the plurality of images captured by the imaging device, and which is characterized in that the imaging optical system includes a polarization beam splitting section which splits a first polarization beam having a first polarization direction and a second polarization beam having a second polarization direction substantially orthogonal to the first polarization direction and allows the polarization beam splitting section to be incident on the imaging device, and in that the imaging device receives the first polarization beam to capture a first polarization image, and receives the second polarization beam to capture a second polarization image, and the distance measurement section measures the distance to the object to be imaged on the basis of the first polarization image and the second polarization image.

Advantageous Effects of Invention

According to the present invention, it is possible to provide a distance measurement technique which further reduces constraints on a size reduction. Incidentally, objects, configurations and effects other than the above are demonstrated in the following embodiments.

DESCRIPTION OF EMBODIMENTS

Figure 1:
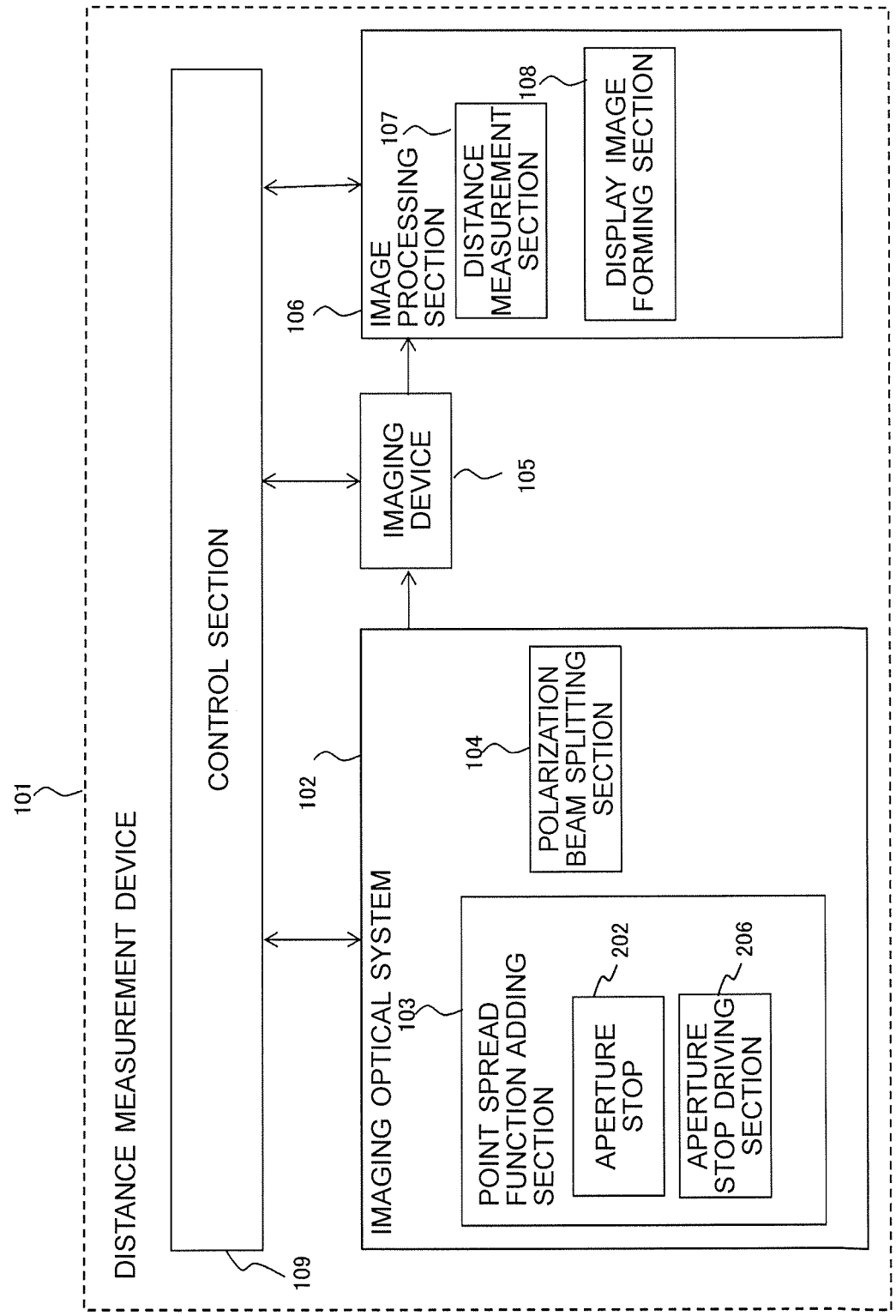
FIG. 1 is a diagram showing a configuration of a distance measurement device in the present invention.

Embodiments of the present invention will hereinafter be described with reference to the accompanying drawings. Like reference numerals designate identical components throughout all the drawings, and their dual description will be omitted.

A wearable terminal such as a head-mounted display or the like directed to the application to an augmented reality (Augmented Reality, AR) technology and a virtual reality (Virtual Reality, VR) technology has recently been made into a product. As one input method by a user in the AR-VR technology, there is known a gesture input to recognize the motion of a hand. Further, in the AR technology, there is a need for a spatial recognition function to grasp a positional relation of an object in space in order to superimpose visual information into the space. A distance measurement technology of measuring depth information of the object is required for implementation of these. A distance measurement technology typified by a time of flight (Time-of-Flight, TOF) method has been utilized therefor.

An active distance measurement device typified by the TOF method requires a light source irradiating an object with light. On the other hand, a distance measurement device according to the present embodiment to be described below is a so-called passive distance measurement device which does not require the light source irradiating the object with the light.

First Embodiment

A first embodiment in the present invention will be described in accordance with the accompanying drawings. FIG. 1 shows one example of a configuration of a distance measurement device 101 in the present invention. The distance measurement device 101 captures an image of a target to be imaged by an imaging device 105 through an imaging optical system 102. The imaging optical system 102 has a point spread function adding section 103 which adds different point spread functions to two orthogonal polarization beams respectively, and a polarization beam splitting section 104 which splits incident light having a first polarization direction and incident light having a second polarization direction substantially perpendicular to the first polarization direction. The term substantially perpendicular referred to here is not intended to limit when a polarization direction axis of the incident light having the first polarization direction, and a polarization direction axis of the incident light having the second polarization direction are exactly 90°, and includes such a case that the angle formed by the polarization direction axis of the incident light having the first polarization direction and the polarization direction axis of the incident light having the second polarization direction is included in an allowable accuracy range in which they are regarded as being orthogonal to each other centering around 90 degrees.

Further, the term "point spread function" is a function indicating a response to a point light source of the optical system. In images each obtained when a light beam generated from one point of a target to be imaged is captured by the imaging device, there occurs a difference in the degree of blurring between the captured images where the point spread functions of the imaging optical system differ. In the present embodiment, the distance is measured by using the difference in the image blur degree.

Image data captured by the imaging device 105 is transferred to an image processing section 106. A distance measurement section 107 generates distance information on the basis of the image, and a display image forming section 108 generates an image for display on which the distance information is reflected. The distance information and display image generated in the image processing section 106 are output to a control section 109 and may be used for usage applications other than the generation of the display image, e.g., an operation input to be described later.

The input side of light in the imaging optical system 102 further includes an aperture stop 202 configured to include, e.g., a plurality of movable vanes, and a aperture stop driving section 206 for driving the aperture stop 202 to change an aperture size. The control section 109 sends a drive control signal to the aperture stop driving section 206 to drive the aperture stop 202 and thereby change the aperture size of the imaging optical system 102 to perform an optical adjustment. Further, the control section 109 performs control of execution timing for each processing in the imaging device 105 and the image processing section 106, and communications with an external device such as an image display device. A CMOS image sensor, a CCD image sensor and the like can be used as the imaging device 105.

Figure 2:
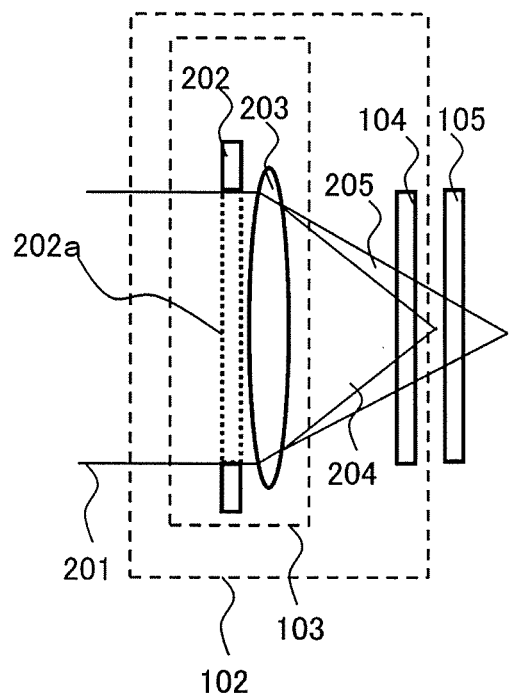
FIG. 2 is a diagram showing a configuration of an imaging optical system and an imaging device in a first embodiment.

FIG. 2 shows one example of a configuration of the imaging optical system 102 and the imaging device 105 in the present embodiment. Incident light 201 incident on the distance measurement device 101 according to the present embodiment enters the point spread function adding section 103 in the imaging optical system 102 and transmits an aperture part 202a formed by the aperture stop 202 in the point spread function adding section 103, and a lens 203. Of the light transmitted through the point spread function adding section 103, a first polarization beam 204 and a second polarization beam 205 perpendicular to each other respectively transmit the point spread function adding section 103 in a state in which they are added with different point spread functions. Afterwards, the first polarization beam 204 and the second polarization beam 205 are received by the imaging device 105 through the polarization beam splitting section 104, so that an image of the target to be imaged is recorded. Although the polarization beam splitting section 104 and the imaging device 105 have been described away from each other for convenience of explanation in FIG. 2, they preferably approximate each other, and both may be configured by laminating them.

Figure 3:
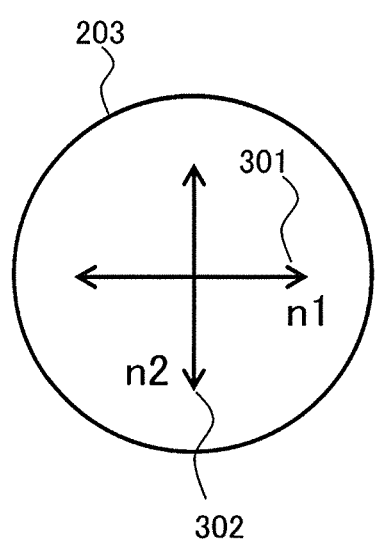
FIG. 3 is a diagram showing a configuration of a lens in the first embodiment.

FIG. 3 shows one example of a configuration of the lens 203 in the present embodiment. Incidentally, a traveling direction of the incident light 201 is assumed to be a direction perpendicular to the paper, a polarization direction of the first polarization beam 204 is assumed to be parallel to an axis 301, and a polarization direction of the second polarization beam 205 is assumed to be parallel to an axis 302.

The lens 203 is made of a birefringent material. A refractive index to the first polarization beam 204 parallel to the axis 301 is $n_1$, and a refractive index to the second polarization beam 205 parallel to the axis 302 is $n_2$. Therefore, a focal length of the lens 203 becomes lengths respectively different from each other with respect to the first polarization beam 204 and the second polarization beam 205. For example, when the lens 203 is a spherical plane-convex lens having a curvature radius R, a focal length $f_1$ to the first polarization beam 204 and a focal length $f_2$ to the second polarization beam 205 can be expressed by equations 1 and 2 respectively. Therefore, for example, when $n_1$ is larger than $n_2$, $f_1$ becomes a value smaller than $f_2$.

(Equation 1) $f_1 = R/(n_1-1)$ (1)

(Equation 2) $f_2 = R/(n_2-1)$ (2)

Figure 4:
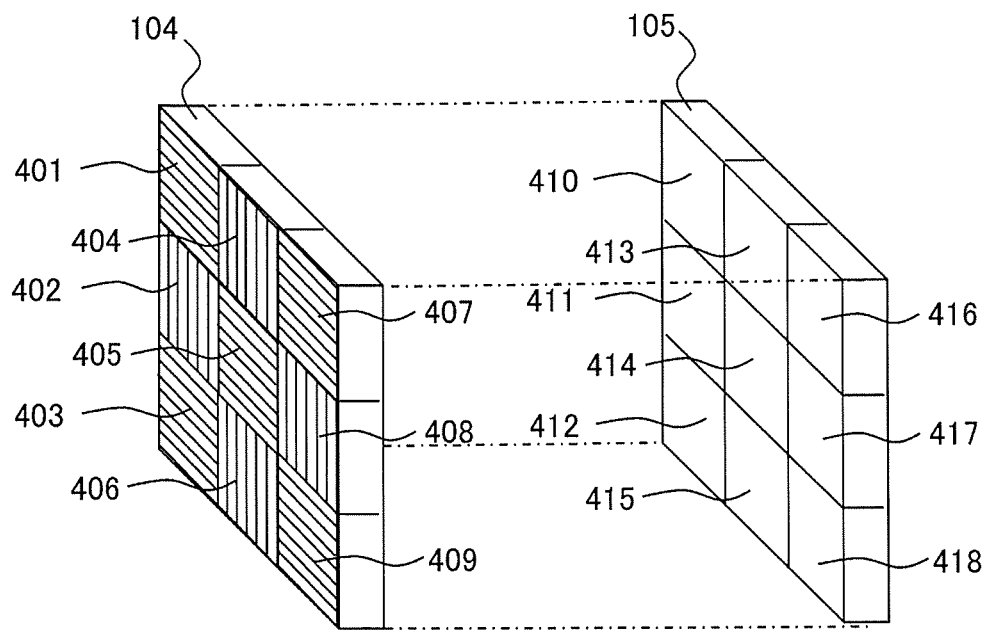
FIG. 4 is a diagram showing a configuration of a polarization beam splitting section and an imaging device in the first embodiment.

FIG. 4 shows one example of a configuration of the polarization beam splitting section 104 and the imaging device 105 in the present embodiment. The polarization beam splitting section 104 is a polarizer array in which first polarizers 401, 403, 405, 407, and 409 which transmit the first polarization beam 204 and shield the second polarization beam 205, and second polarizers 402, 404, 406, and 408 which shield the first polarization beam 204 and transmit the second polarization beam 205 are arranged. The polarization beam splitting section 104 and the imaging device 105 are disposed in such a manner that the beams transmitted through the first polarizers or second polarizers 401 through 409 are respectively imaged by pixels 410 through 418 of the imaging device 105. Therefore, the pixels 410, 412, 414, 416, and 418 capture only the first polarization beam 204, and the pixels 411, 413, 415, and 417 capture only the second polarization beam 205.

FIG. 4 describes a part of the pixels which constitute the imaging device 105. The number of pixels is not limited to that shown in FIG. 4. Further, the pixels 410 through 418 may be single monochrome image sensors respectively. Alternatively, the respective pixels of the pixels 410 through 418 may be Bayer filter-type image sensors respectively having one or more pixels corresponding to RGB.

With the configuration as described above, it is possible to allow the first polarization beam 204 and the second polarization beam 205 to be incident on the imaging device 105 at different focal lengths respectively and individually capture a first polarization image obtained by capturing the first polarization beam 204 by the imaging device 105 and a second polarization image obtained by capturing the second polarization beam 205 respectively by the imaging device 105. It is therefore possible to simultaneously capture the first polarization image and the second polarization image being two images different in blur amount and execute a distance measurement by a Depth from defocus (DFD) method being one of lens focal methods.

The lens focal method is accompanied by a problem that since it needs at least two or more images different in blur amount, imaging is performed plural times while changing the distance between the lens and the imaging device 105 in the conventional DFD method, and the measurement time is long as compared with other distance measurement methods. Further, the configuration described in Patent Literature 1 has a problem in that images different in blur amount can be simultaneously captured by using the two or more imaging devices 105, but power consumption is increased because the number of imaging devices 105 increases. On the other hand, according to the configuration of the present embodiment, there can be provided a small-sized/low power consumption distance measurement device which executes the distance measurement by the DFD method at high speed because the two first polarization image and second polarization image different in blur amount can simultaneously be captured by using one imaging device 105.

Incidentally, the number of polarizers that constitute the polarization beam splitting section 104 and how to arrange them are not limited to those shown in FIG. 4. For example, the first polarizers 401, 403, 405, 407, and 409, and the second polarizers 402, 404, 406, and 408 may be those arranged in a stripe form. Also, a polarizer array using a photonic crystal may be used for the polarization beam splitting section 104. Further, the number of pixels that constitute the imaging device 105 is not limited to that shown in FIG. 4.

Further, in the configuration of the polarization beam splitting section 104 and the imaging device 105 in the present embodiment, since the half of the pixels of the imaging device 105 is used for the imaging of the first polarization image, and the other half of the pixels is used for the imaging of the second polarization image, the number of pixels of the image obtainable in the imaging device 105 is reduced by half, but for the uncapturable pixels, the first polarization image and the second polarization image can be generated by performing interpolation processing on the basis of a light intensity signal received by the adjacent pixels. Considering the second polarization image by way of example, the pixel 414 of FIG. 4 is not capable of measuring a light intensity signal of the second polarization beam 205, and hence the light intensity signal for the corresponding pixel lacks. However, the average value of light intensity signals of the second polarization beam 205, which are measured by the surrounding pixels 411, 413, 415, and 417 is inserted as the light intensity signal of the second polarization beam 205 of the pixel 414 to interpolate the light intensity signal of the pixel 414, whereby the second polarization image can be generated. The first polarization image can be generated by performing similar interpolation processing even on the image of the first polarization beam 204.

Further, the lens 203 in the present embodiment may be a lens using a birefringent crystal such as a crystal, calcite, magnesium fluoride, barium metaborate, or the like or may be a plastic lens indicative of birefringence.

Figure 5A:
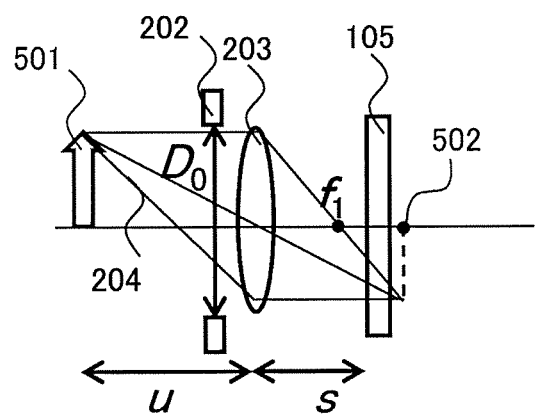
FIG. 5A is a diagram showing the manner in which a target to be imaged is captured by a first polarization beam in the distance measurement device of the present invention.

Here, the distance measurement method according to the present embodiment will be described using FIGS. 5 and 6. FIG. 5 is a diagram describing the manner in which an object 501 to be imaged is captured in the distance measurement device of the present embodiment. The distance between the object 501 and the lens 203 is assumed to be u, and the distance between the lens 203 and the imaging device 105 is assumed to be s. Further, the diameter of the aperture part 202a is assumed to be $D_0$. FIG. 5A shows the manner in which the incident light of the first polarization beam 204 is captured by the imaging device 105. Light of the first polarization beam 204 resulting from one point of the object 501 is transmitted through the lens 203 and then imaged on an imaging point 502 focused with the lens having the focal length $f_1$.

Figure 5B:
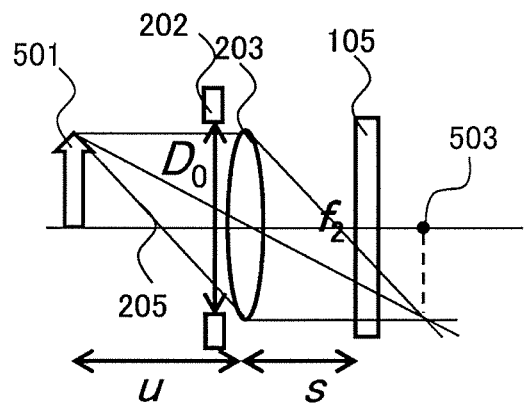
FIG. 5B is a diagram showing the manner in which a target to be imaged is captured by a second polarization beam in the distance measurement device of the present invention.
Figure 6A:
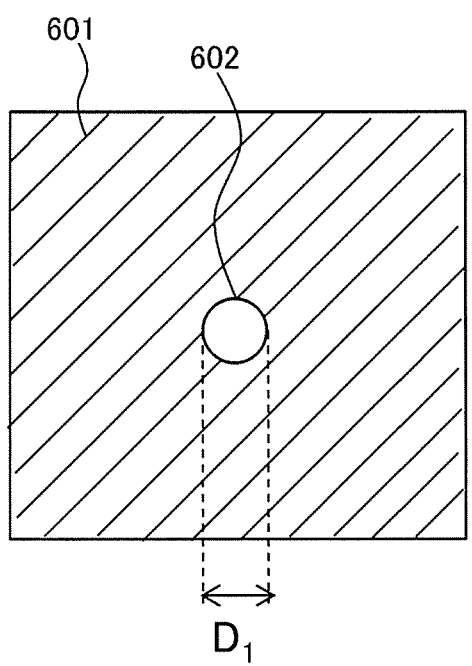
FIG. 6A is a diagram showing a point spread function of the first polarization beam captured by the imaging optical system.
Figure 6B:
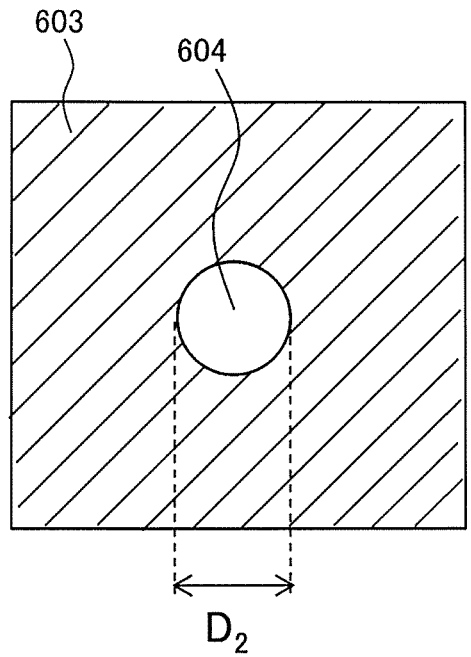
FIG. 6B is a diagram showing a point spread function of the second polarization beam captured by the imaging optical system.

FIG. 5B shows the manner in which the incident light of the second polarization beam 205 is imaged by the imaging device 105. Light of the second polarization beam 205 resulting from one point of the object 501 is transmitted through the lens 203 and then imaged on an imaging point 503 focused with the lens having the focal length $f_2$. In the case of FIG. 5, since the distance between the imaging point 502 and the imaging device 105 is shorter than the distance between the imaging point 503 and the imaging device 105, the image of the second polarization beam 205 becomes an image stronger in blur than that of the first polarization beam 204.

A description will be made as to the difference in blur amount between the captured images of the first polarization beam 204 and the second polarization beam 205 with reference to FIG. 6. An image in the case where rays of light resulting from one point of the object 501 are captured by the imaging device 105 is called a point spread function (Point Spread Function, PSF). FIG. 6 illustrates a point spread function captured by the imaging optical system of the present embodiment. An image 601 is an example of an image when imaging a point spread function 602 of the first polarization beam 204. An image 603 is an example of an image when imaging a point spread function 604 of the second polarization beam 205. The diameter $D_1$ of the point spread function 602 can be represented by an equation 3 when using $D_0$, u, s and $f_1$. The diameter $D_2$ of the point spread function 604 can be represented by an equation 4 when using $D_0$, u, s and $f_2$.

(Equation 3) $D_1 = sD_0(1/f_1 - 1/u - 1/s)$ (3)

(Equation 4) $D_2 = sD_0(1/f_2 - 1/u - 1/s)$ (4)

When capturing the object 501 with the first polarization beam 204 or the second polarization beam 205, an image corresponding to the convolution integral of the point spread functions respectively shown in the equations 3 and 4 with the image of no blur object 501 is captured. Therefore, by extracting the size of the point spread function 602 or 604 from the convoluted image of the first polarization beam 204 or the second polarization beam 205, the distance between the object 501 and the lens 203 can be measured.

As a method of extracting the point spread function from the two convoluted images, for example, a two-dimensional Fourier transform may be utilized. The point spread function may be calculated by using a Spatial Domain Convolution/Deconvolution Transform described in the following Literature.

LITERATURE NAME

Murali Subbarao, Gopal Surya, "Depth from defocus: A spatial domain approach," International Journal of Computer Vision, (US) Springer, 1994, December, Volume 13, No. 3, p. 271-294.

Incidentally, the imaging device 105 may be disposed in such a manner that either the first polarization image or the second polarization image is formed on the imaging device 105. With such an arrangement, one of the two images captured for distance measurement is displayed as it is and thereby usable as a display image for a user in AR systems or the like. Further, even when neither of the first polarization image and the second polarization image is formed on the imaging device 105, the PSF is calculated from the two polarization images and thereafter blurring of the captured image is removed based on information of the PSF, whereby a display image for the user may be generated.

Next, an example of a distance measurement processing flow using the distance measurement device 101 of the present embodiment will be described using FIG. 13. A processing S1301 performs initialization of a part related to the distance measurement such as an adjustment of the PSF size.

In a processing S1302, the first polarization beam 204 is captured to generate a first raw (raw) polarization image, and the second polarization beam 205 is captured to generate a second raw polarization image.

In a processing S1303, interpolation processing is performed on the first raw polarization image and the second raw polarization image captured in the processing S1302 respectively to generate a first polarization image and a second polarization image.

In a processing S1304, a PSF is extracted from the first polarization image and the second polarization image generated in the processing S1303.

In a processing S1305, the distance to a target object is calculated based on the PSF extracted in the processing S1304.

In a processing S1306, information about the distance measured in the processing S1305 is output in a form depending on the application. For example, in the case of a usage method of providing the user with the distance information to an object as a display image, an image obtained by superimposing the distance information measured in the processing S1305 on the image captured in the processing S1302 is generated and displayed on a displaying display or the like. Further, when used for the recognition of a gesture input in the AR system, distance measurement information is recorded, and the difference between the distance measurement information and distance measurement information measured in the processing S1305 at the next distance measurement is calculated to determine the input contents, which is then output to the input of the AR system.

In a processing S1307, a determination is made as to the continuation and end of the measurement. In the case of the continuation thereof (S1307/No), the distance measurement processing proceeds to the processing S1302. In the case of the end thereof (S1307/Yes), the distance measurement processing is terminated.

Next, a method for adjusting the PSF size will be described. Generally, when the focal length of the lens 203, the diameter of the aperture part 202a, the distance between the imaging device 105 and the lens 203, etc. are the same conditions, an object lying in the vicinity than a distant object becomes large in PSF. When the PSF becomes a predetermined size or more as compared with the imaging device 105, accurate distance measurement can not be performed. Therefore, an operation to control the diameter of the aperture part 202a and the distance between the imaging device 105 and the lens 203 and reduce the size of the PSF is required.

Whether the size of the PSF is appropriate can be determined from the change in the PSF extracted before and after the change of the diameter of the aperture part 202a, for example. Originally, when the diameter of the aperture part 202a is reduced, the PSF of an image captured by the imaging device 105 becomes small. When, however, the diameter of the aperture part 202a is made small where the size of the PSF becomes a predetermined size or more than the imaging device 105, the PSF size extracted from the image remains unchanged or increases. This is because when the PSF is a predetermined size or more, at least one of the two images used for DFD does not cause a distinct change in terms of how to blur even if the diameter of the aperture part 202a is made small. In this situation, when another image is reduced in blur amount under the influence of the diameter of the aperture part 202a being reduced, the difference in blur amount between the two images increases. In the present measuring method, an increase in the difference in the blur amount means an increase in the PSF. Further, when another image does not cause a distinct change either where the diameter of the aperture part 202a is reduced, the difference in the amount of blurring is not generated between the two images even if the diameter of the aperture part 202a is changed, thereby leading to the calculation result that the PSF is constant. It is determined using this characteristic whether the PSF size is appropriate. When it is not appropriate, the PSF size is reduced.

An example of a processing flow for the PSF size adjustment will be described using FIG. 14.

In a processing S1401, the diameter of the aperture part 202a is set.

In a processing S1402, a first polarization image and a second polarization image are generated to extract a PSF. The term "the generation of the first polarization image" may be processing of capturing the first raw polarization image and performing interpolation processing thereto to generate the first polarization image, or may be processing in which the first polarization image is obtained in a state of having no defects in pixels of the imaging device 105 upon imaging the first polarization beam 204 as in a second embodiment to be described later. The same applies even to the second polarization image.

In a processing S1403, the diameter of the aperture part 202a is changed.

In a processing S1404, the first polarization image and the second image are captured again to extract the PSF.

In a processing S1405, the PSF extracted in the processing S1402 and the PSF extracted in the processing S1404 are compared with each other to determine whether the current PSF is appropriate. For example, when the diameter of the aperture part 202a at the capturing in the processing S1402 is larger than the diameter of the aperture part 202a at the capturing in the processing S1404, the PSF extracted in the processing S1402 is determined to be appropriate if being larger than the PSF extracted in the processing S1404 (S1405/Yes), and the processing is terminated.

On the other hand, when it is determined that the PSF extracted in the processing S1402 is smaller than the PSF extracted in the processing S1404 or remains unchanged, it is determined that the current PSF exceeds the proper size (S1405/No). The processing proceeds to the processing S1403, and a PSF is extracted in the processing S1404 after changing the diameter of the aperture part 202a again.

In the processing S1405, the PSF extracted in the first processing S1404 and the PSF extracted in the second processing S1404 are compared with each other to re-determine whether the PSF size is appropriate.

Figure 13:
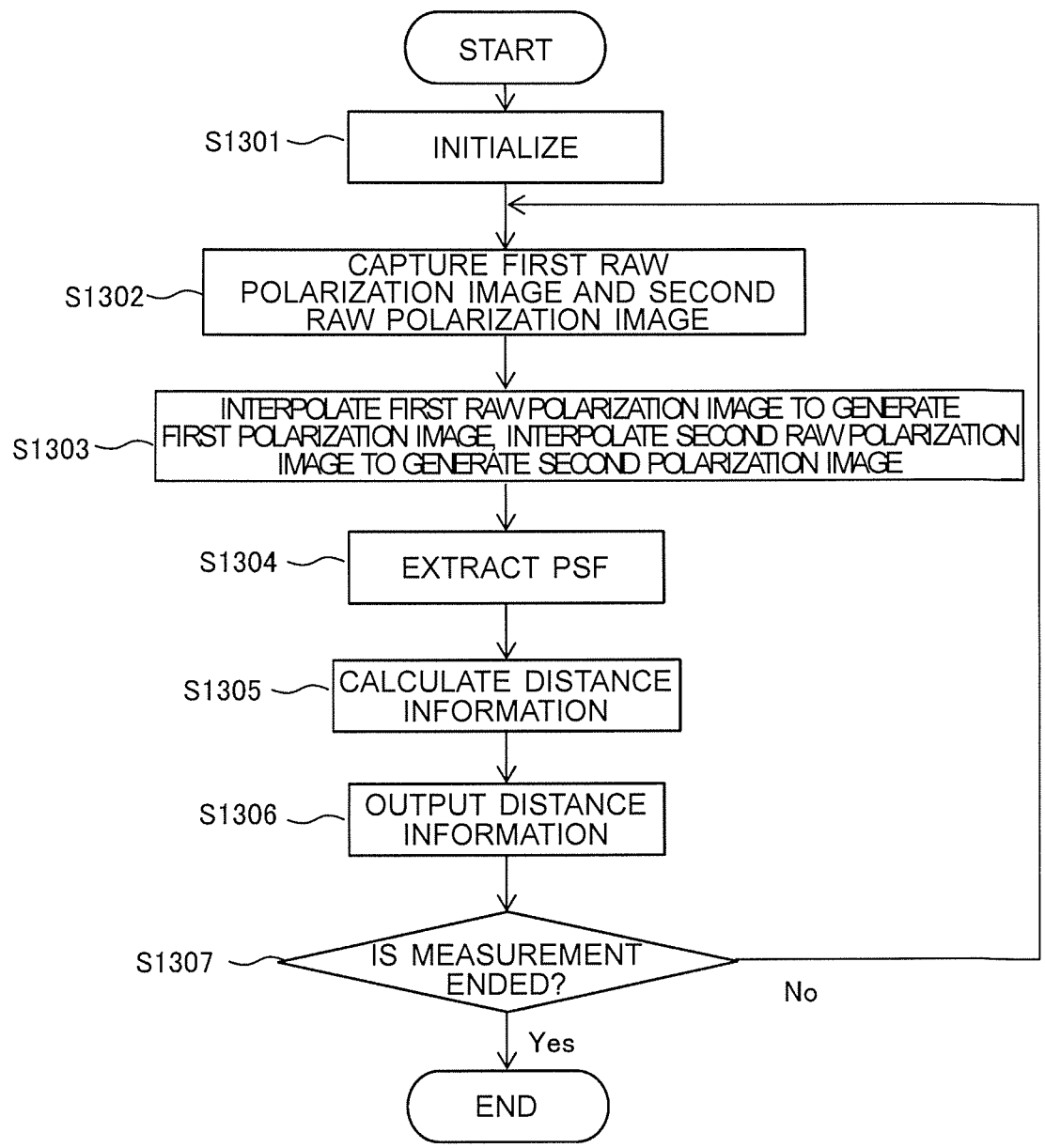
FIG. 13 is a diagram showing a distance measurement processing flow in the first embodiment.
Figure 14:
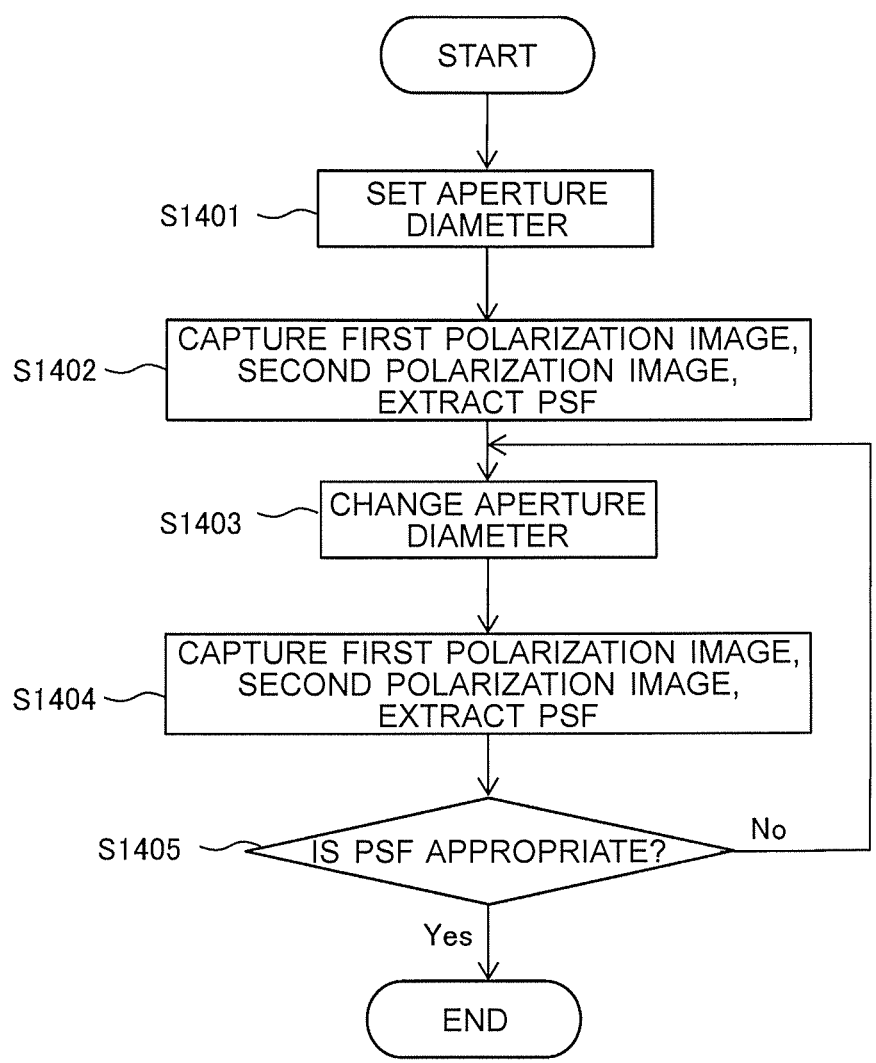
FIG. 14 is a diagram showing a processing flow for a PSF size adjustment in the first embodiment.

Incidentally, the processing of FIG. 14 may be done only once within the processing S1301 of FIG. 13. The processing may be done every time when shifting from the processing S1307 to the processing S1302 or may be done every several times. Further, when the processing of FIG. 14 is done upon shifting from the processing S1307 of FIG. 13 to the processing S1302, the distance information calculation of the processing S1405 is performed using the PSF sizes extracted in the processing S1402 and the processing S1404, so that the processing S1302 to the processing S1304 may be omitted.

Figure 21:
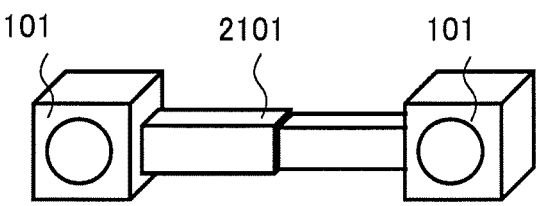
FIG. 21 is a diagram showing a configuration in which two cameras are provided as distance measurement devices in a stereo method distance measurement device having a variable base length.

Incidentally, the distance measurement performance may be improved by using a plurality of the distance measurement devices 101 of the present embodiment in combination. FIG. 21 shows an example of a configuration in which two cameras are provided as the distance measurement devices 101 of the present embodiment in a stereo method distance measurement device having a variable base length. The two distance measurement devices 101 are fixed to a camera holding section 2101. The camera holding section 2101 has a telescopic function and changes the base length according to the required distance measurement accuracy. With the above configuration, for example, distance information measured by the distance measurement device 101 and distance information measured by the stereo method are compared with each other to thereby make it possible to calibrate the change in the base length when expansion and contraction of the camera holding section 2101 or due to a change in temperature or stress-time degradation.

An application destination of the distance measurement device 101 of the present embodiment includes, for example, an AR corresponding type image display device such as a head-mounted display, or a mobile information terminal such as a smart phone. An example of using the distance measurement device 101 in the image display device such as the head-mounted display will be described using FIGS. 15 to 18.

Figure 15:
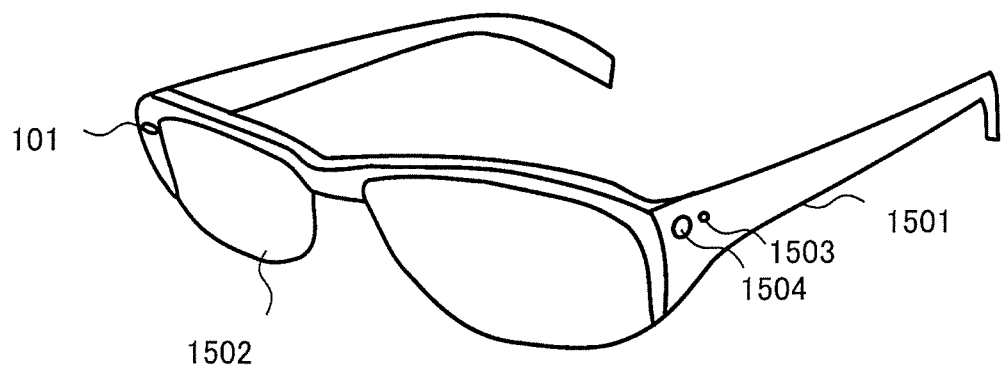
FIG. 15 is a diagram showing an example of a configuration where the distance measurement device is used in an image display device.
Figure 16:
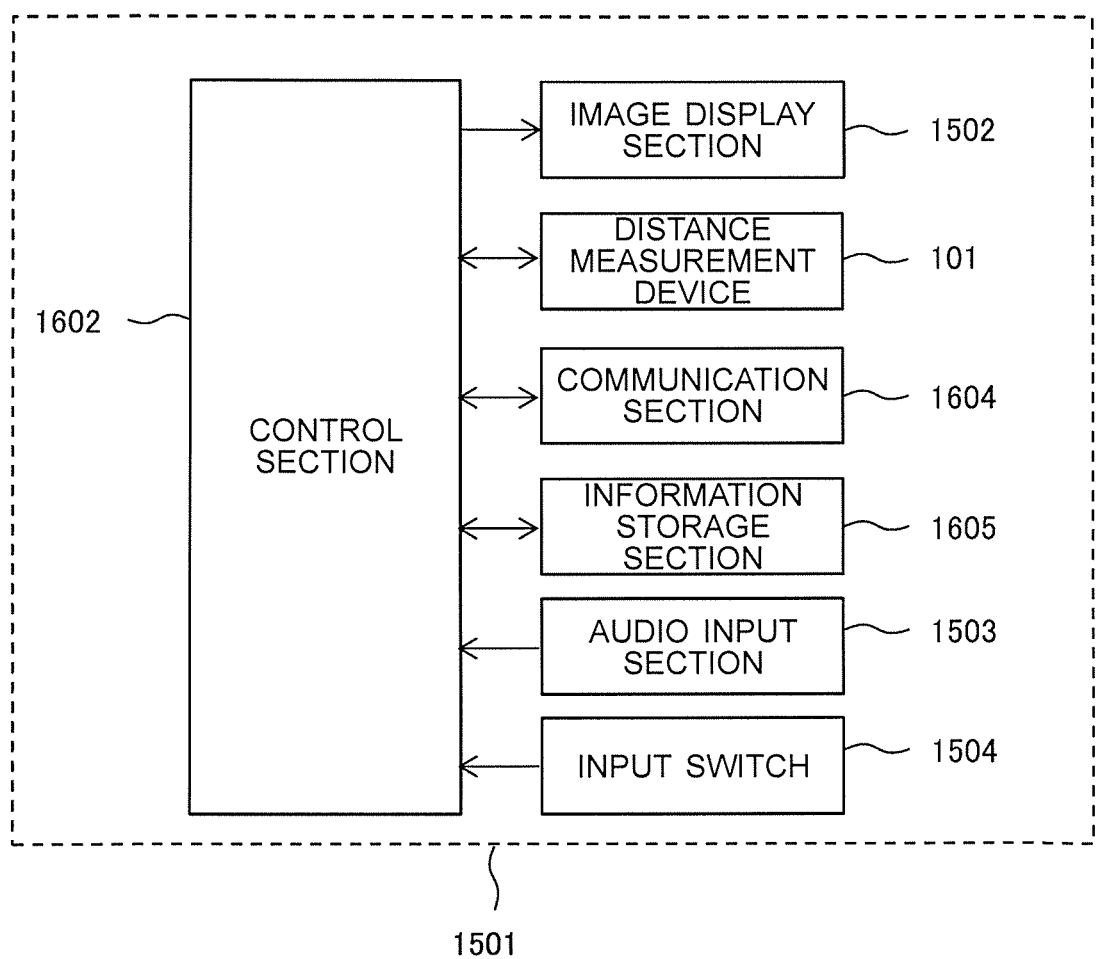
FIG. 16 is a diagram showing an example of a configuration where the distance measurement device is used in the image display device.

FIG. 15 shows an example of an external appearance in the case of using the distance measurement device 101 of the present embodiment in the image display device 1501. FIG. 16 shows an example of a configuration in the case of using the distance measurement device 101 of the present embodiment in the image display device 1501. The image display device 1501 is configured to include an image display section 1502, an audio input section 1503, an input switch 1504, a personal computer held by a server on a network or a user, a communication section 1604 which communicates with a mobile information terminal or the like, an information storage section 1605 storing information therein, and a control section 1602.

The distance measurement device 101 is arranged so as to be able to measure the forward when the user wears the image display device 1501 as an example. The control section 1602 controls the operations of the image display section 1502, the distance measurement device 101, the communication section 1604, and the information storage section 1605 on the basis of inputs from the distance measurement device 101, the audio input section 1503, the input switch 1504, the communication section 1604, and the information storage section 1605.

Figure 17:
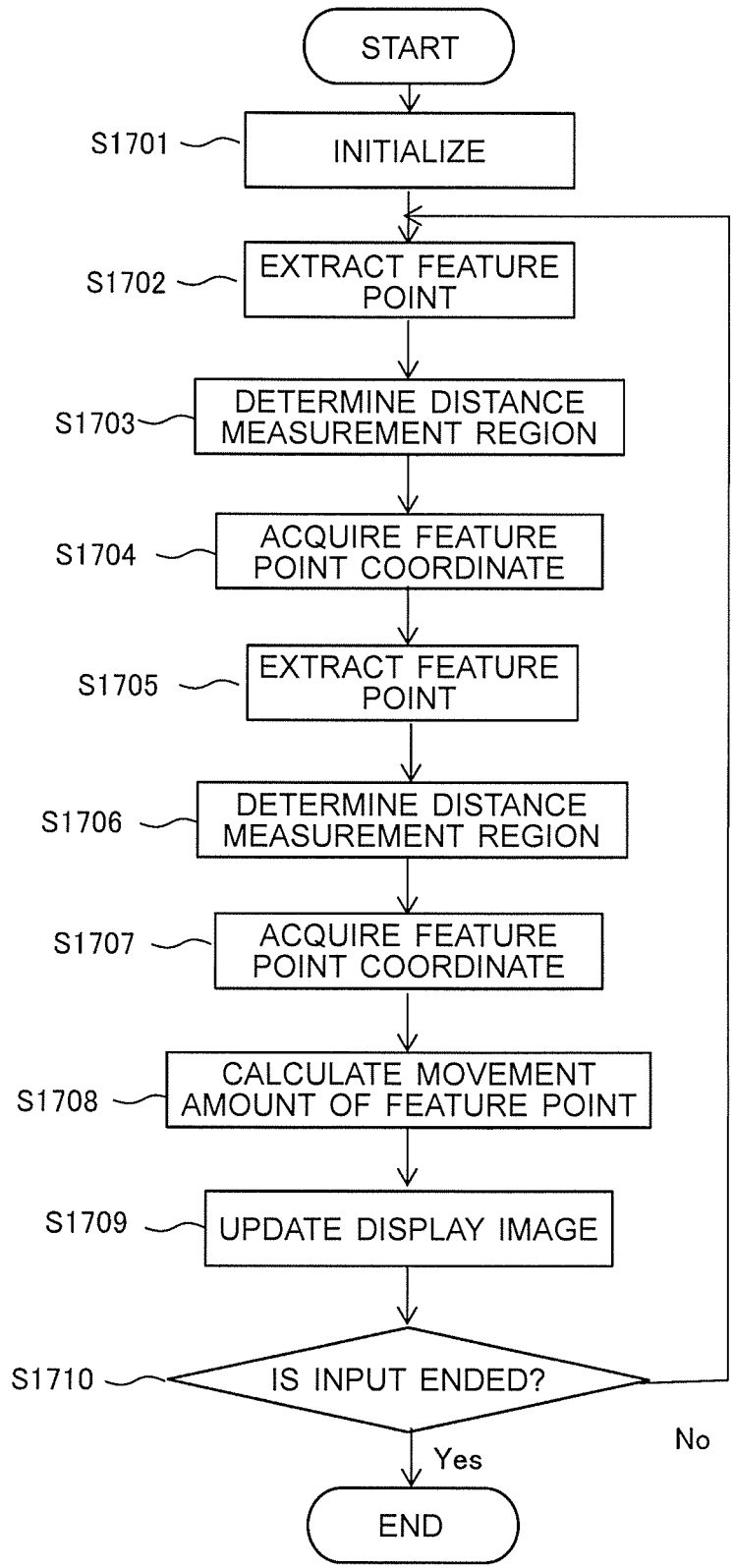
FIG. 17 is a diagram showing a processing flow for a gesture input in the image display device using the distance measurement device.

FIG. 17 shows a processing flow for a gesture input in the image display device 1501 using the distance measurement device 101. The image display device 1501 starts gesture recognition processing in the distance measurement device 101 in accordance with an instruction from the control section 1602. Start timing of the gesture recognition processing may be the immediately following the startup of the image display device 1501, or may always be done in accordance with the inputs from the audio input section 1503, the input switch 1504, the mobile information terminal connected to the communication section 1604, etc.

In a processing S1701, a part related to the distance measurement is initialized.

In a processing S1702, the hand of the user is recognized from an image captured by the imaging device 105 to extract feature points.

In a processing S1703, a distance measurement region is determined based on the feature points extracted in the processing S1702.

In a processing S1704, the distance measurement of the distance measurement region determined in the processing S1703 is performed to acquire the three-dimensional coordinates of the respective feature points.

Then, feature points of the user's hand are extracted again in a processing S1705, and a distance measurement region is determined in a processing S1706.

In a processing S1707, the distance measurement of the distance measurement region determined in the processing S1706 is performed to acquire the three-dimensional coordinates of the respective feature points again.

In a processing S1708, a movement amount of the feature point is calculated from the difference between the respective feature points acquired in the processing S1704 and the processing S1707, and the display image on which the movement amount of the feature point is reflected is updated in a processing S1709.

In a processing S1710, a determination is made as to the end and continuation of the input. In the case of the end thereof (S1710/Yes), the input is terminated. In the case of the continuation thereof (S1710/No), the processing flow is returned to the processing S1702. Incidentally, in the scene or the like where a change in the position of the user's hand is small, the feature point extracting processing and the distance measurement region determining processing are not performed each time the feature point coordinate acquiring processing is executed, and may be executed once in several times. Further, a waiting time may be deliberately provided between the processing S1704 and the processing S1707.

Figure 18A:
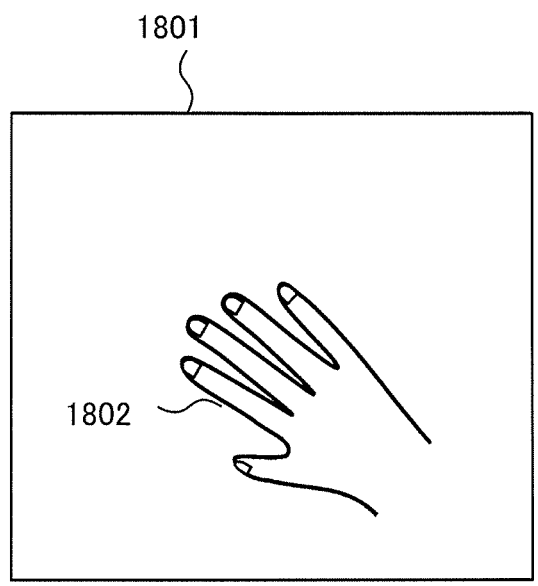
FIG. 18A is a diagram showing an image to be captured at the time of hand recognition processing by a user in the image display device using the distance measurement device.
Figure 18B:
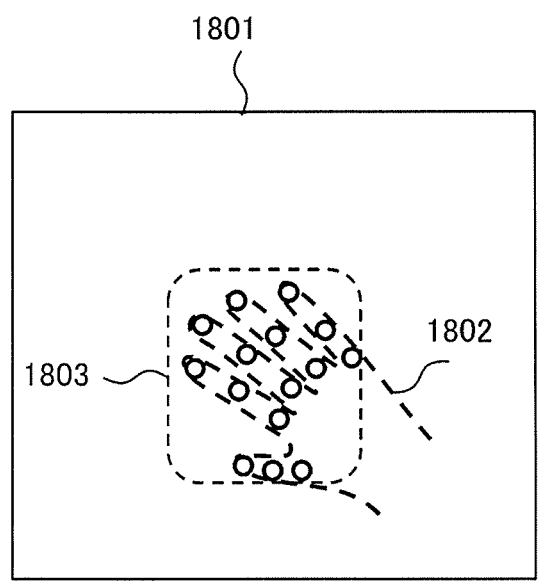
FIG. 18B is a diagram showing an image to be processed at the time of feature point extraction processing of a user's hand in the image display device using the distance measurement device.

FIG. 18 shows an example of an image to be captured and processed by the distance measurement device 101 at the time of execution of the processing S1702 and the processing S1703. When it is recognized that a user's hand 1802 is reflected onto an imaging screen 1801 (FIG. 18A), a feature point 1803 is extracted in the processing S1702 as shown in FIG. 18B. The recognition of the user's hand 1802 is performed based on the color or shape, for example. Further, a user registration function is provided to the image display device 1501 to thereby register the color and size of the user's hand 1802, and a region with high frequency of use to the gesture input on the imaging screen. The recognition may be performed based on these registration information to enhance the recognition accuracy of the user's hand 1802. Furthermore, as the feature point 1803, for example, the joints of the user's hand 1802, etc. are used.

Figure 18C:
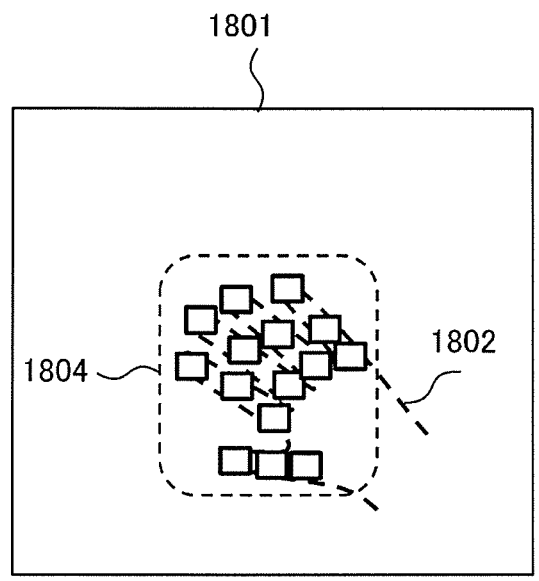
FIG. 18C is a diagram showing an image to be processed at the time of distance measurement region determination processing in the image display device using the distance measurement device.

Next, in the processing S1703, a distance measurement region 1804 is determined in such a manner that depth information of the feature point 1803 can be acquired (FIG. 18C). When the above processing is performed, the load of calculation processing can be reduced because it is not necessary to perform the distance measurement processing for all pixels of the imaging device 105.

Further, for example, as shown in FIG. 18B and FIG. 18C, an image obtained by superimposing the feature points and the distance measurement region may be displayed to the user at the image display section 1502, or the distance information to the respective feature points may be superimposed and displayed. As a method of displaying the distance, for example, numeric values may be superimposed as they are, or the distance may be displayed as isolines or isolines stepwise colored according to the distance.

In the above example, the head-mounted display is used as the image display device, and the input operation to the head-mounted display is performed with the gesture of the user's hand to calculate the amount of movement of the feature point of the hand by the distance measurement device according to the present embodiment. Then, an operation signal indicating the amount of its movement is output to the control section to update the display image reflecting the movement amount of the feature point. However, there may be configured such that the operation to switch the communication destination where the head-mounted display has a function different from the image display device, e.g., the head-mounted display has a function to communicate with the external device, or the input operation to perform a volume adjustment where it has an audio output function is performed by the gesture, and the input operation is performed by the control section.

Other application destinations of the distance measurement device 101 of the present embodiment include, for example, an automobile, an unmanned aircraft such as a drone, a robot, a surgical operation assisting system, a precise shape measuring device, etc. The distance measurement device 101 may be mounted in a mobile mechanical device such as an automobile, a drone, a disaster survey robot and an industrial robot, and utilized in collision avoidance by surrounding monitoring. Position information and distance measurement information may be uploaded to the server on the network and presented to a remote operator. The position information and the distance measurement information uploaded to the server on the network may be shared with another mobile mechanical device and utilized in cooperative position control of the mobile mechanical device in the automatic operation and autonomous navigation.

Figure 19:
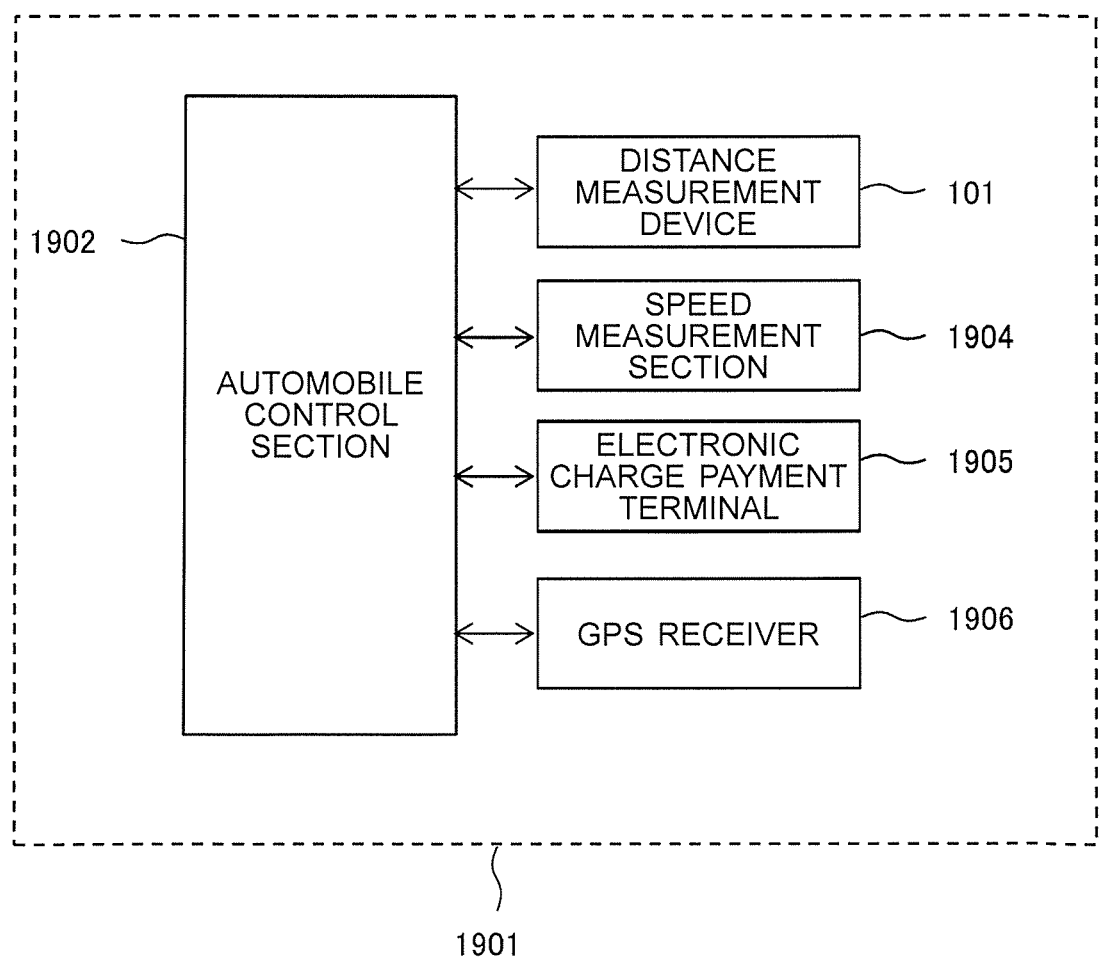
FIG. 19 is a diagram showing a configuration where the distance measurement device is used in a surroundings-monitoring system of a vehicle.

FIG. 19 is a diagram in which in an example of a configuration where the distance measurement device 101 is used in a surroundings-monitoring system of an automobile 1901, a part interlocked with the distance measurement device 101 is extracted. The distance measurement device 101 obtains the current traveling state from a speed measurement section 1904, an electronic charge payment terminal 1905, a GPS receiver 1906, etc. through an automobile control section 1902 to determine a distance measurement range.

Figure 20:
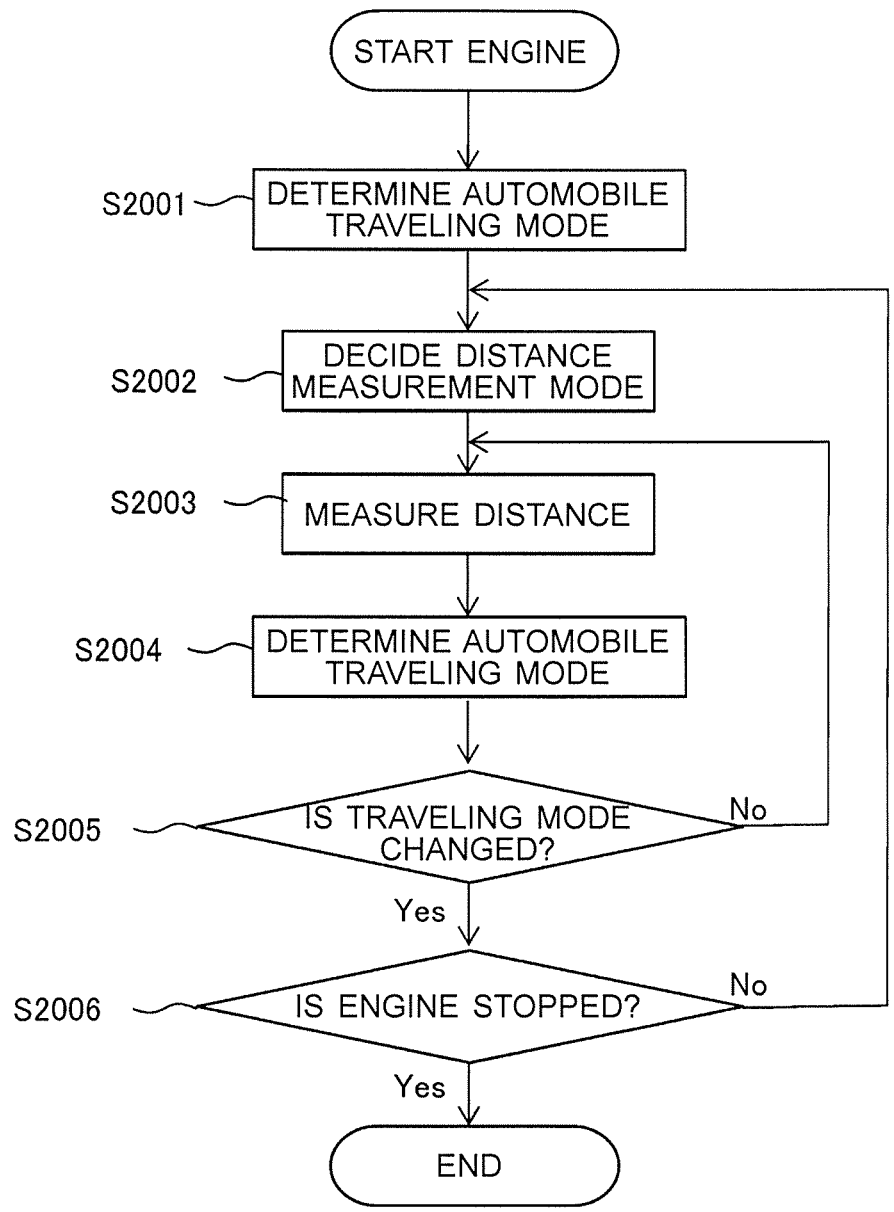
FIG. 20 is a diagram showing a processing flow to determine a distance measurement range on the basis of a traveling state of the vehicle.

FIG. 20 shows an example of a processing flow for determining the distance measurement range, based on the traveling state of the automobile. An automobile traveling mode is determined in a processing S2001 after the engine of the automobile has started. The automobile traveling mode may be determined by the speed measurement section 1904, for example. A determination may be made by the GPS receiver 1906 as to whether a traveling speed and a road on which the automobile is traveling at present are subject to a highway or a general road. Further, on the basis of communication records of the electronic charge payment terminal 1905, a determination may be made as to whether the road on which the automobile is traveling at present is a toll highway or a general road.

After determining the current traveling mode in the processing S2001, a distance measurement mode is decided based on the determination result in a processing S2002. In the distance measurement mode, for example, the diameter of the aperture part 202a is set to increase the PSF in order to perform the remote distance measurement with high accuracy during high-speed traveling, and the diameter of the aperture part 202a is set to decrease the PSF in order to perform the distance measurement at a close range with high accuracy during low-speed traveling. Also, since it is necessary to cope even with sudden interruption to the front, of pedestrians and light vehicles during traveling on a general road, the PSF size optimizing processing by the diameter control of the aperture part 202a described in FIG. 14 is also performed.

Further, in the processing S2002, the pixel region used for the distance measurement, of the pixels in the imaging device 105 is changed based on the determination result of the processing S2001, for example, the distance measurement may be performed at all pixels during the general road traveling, and the distance measurement may be performed only by some pixels in the imaging device during traveling on the highway. Even in addition to the above, the pixel region used for the distance measurement may be changed in accordance with the shape of the road like intersections, curves, straight lines, etc.

After deciding the distance measurement mode in the processing S2002, the distance measurement processing described in FIG. 13 and FIG. 14 is performed in a processing S2003, and the distance information to an object around the vehicle is used for collision avoidance control or automatic driving control.

In a processing S2004, the automobile traveling mode is determined again. In a processing S2005, a determination is made as to whether the automobile traveling mode is changed. When the automobile traveling mode remains unchanged (S2005/No), the processing flow returns to the processing S2003 and the distance measurement is continued. When the traveling mode is changed (S2005/Yes), it is determined in a processing S2006 whether the engine is stopped. When the engine is stopped (S2006/Yes), the processing is terminated. When the engine is not stopped (S2006/No), the processing flow returns to the processing S2002, where the distance measurement mode suitable for the traveling state is re-selected.

Also, the distance information around the vehicles obtained by the distance measurement device 101 of the present embodiment may be displayed on an image display device such as a head-up display to display an image on the automobile and its windshield, an image display screen of a car navigation system, or the like. For example, when displayed on the head-up display, a marker and distance information may be displayed with being superimposed on the forward vehicle and pedestrian. A marker superimposed on an object high in the degree of risk of collision may be displayed in color different from the colors of other markers. Further, the moving speed of each object may be estimated from a change in the distance between the own vehicle and the object and displayed on the image display section.

Further, the distance information measured by the respective vehicles are transmitted to the center of the car navigation system or the like and integrated to generate highly accurate positional information of the vehicle/pedestrian on the road. Then, the generated information may be transmitted to each vehicle and displayed on the image display section of the car navigation system or the head-up display.

Second Embodiment

The present embodiment is different from the first embodiment in that a polarization beam splitting section is configured of a polarizer and a polarization control element. With this configuration, an image of a first polarization beam 204 and an image of a second polarization beam 205 can respectively be captured by using all pixels of an imaging device 105. The interpolation processing becomes unnecessary as compared with the configuration of the first embodiment, and high resolution can be attained.

A method of capturing a first polarization image and a second image in the present embodiment will be described using FIG. 7. FIG. 7 shows an example of a configuration of an imaging optical system 102 and the imaging device 105 in the present embodiment. Incident light 201 incident on the imaging optical system 102 enters into a polarization beam splitting section 104 and is transmitted through a polarization control element 702 and a polarizer 701 and then transmitted through the polarization beam splitting section 104. After passing through the polarization beam splitting section 104, the incident light is transmitted through a point spread function adding section 103 and imaged by the imaging device 105.

The polarizer 701 is an element to take out a specific polarization component of the incident light 201 polarized at random. The polarization control element 702 is constituted of, for example, a liquid crystal element and capable of rotating the polarization beam of light to be transmitted through the polarization control element 702 in any direction by voltage control. Therefore, the light transmitted through the polarizer 701 is transmitted through the polarization control element 702 to perform voltage control thereof, whereby the polarization beam entering into the point spread function adding section 103 can be switched to a first polarization beam 204 and a second polarization beam 205 different in polarization direction.

Figure 7A:
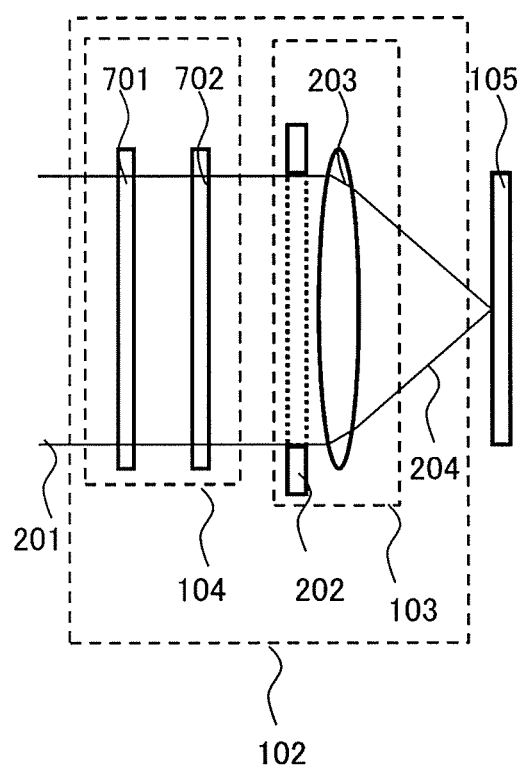
FIG. 7A is a diagram showing a configuration of an imaging optical system and an imaging device where a polarization control element is controlled in such a manner that a polarization beam of light transmitted through the polarization control element becomes a first polarization beam in a second embodiment.

FIG. 7A shows a configuration of the imaging optical system 102 and the imaging device 105 where the polarization control element 702 is controlled such that the polarization beam of light transmitted through the polarization control element 702 becomes the first polarization beam 204. Since a lens 203 functions as a lens having a focal length $f_1$ with respect to the first polarization beam 204, an image to be captured by the imaging device 105 becomes an image captured by the lens having the focal length $f_1$.

Figure 7B:
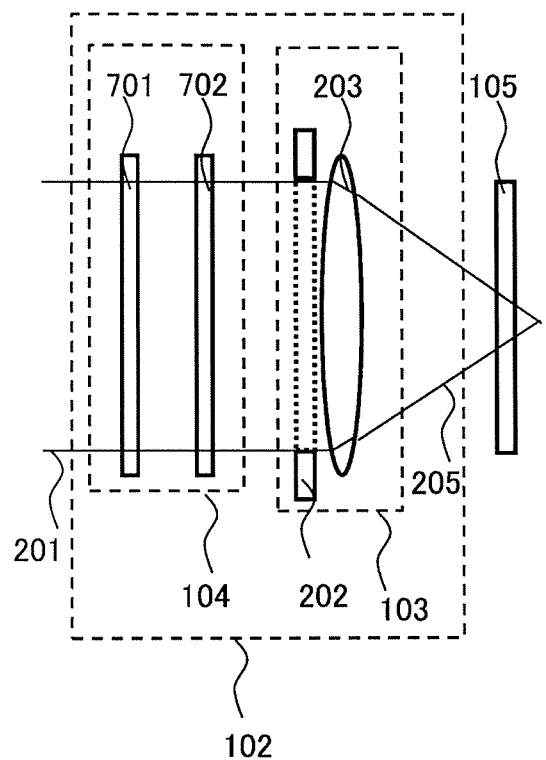
FIG. 7B is a diagram showing a configuration of the imaging optical system and the imaging device where the polarization control element is controlled in such a manner that the polarization beam of light transmitted through the polarization control element becomes a second polarization beam in the second embodiment.

FIG. 7B shows a configuration of the imaging optical system 102 and the imaging device 105 where the polarization control element 702 is controlled in such a manner that the polarization beam of light transmitted through the polarization control element 702 becomes the second polarization beam 205. Since the lens 203 functions as a lens having a focal length $f_2(>f_1)$ with respect to the second polarization beam 205, an image to be captured by the imaging device 105 becomes an image captured by the lens having the focal length $f_2$.

With the above configuration, the two images (corresponding to the first polarization image and the second polarization image) different in blur amount can be captured, and the distance measurement of the target object by the DFD method can be performed. Further, since the first polarization image and the second polarization image are captured separately twice, the number of pixels of the imaging device 105 usable when capturing each image is increased twice in comparison with the first embodiment, and hence high resolution can be attained.

Figure 8:
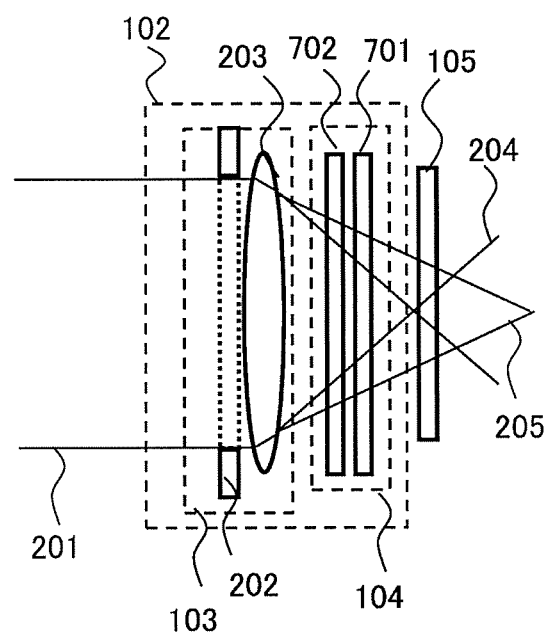
FIG. 8 is a diagram showing a configuration of the imaging optical system and the imaging device in the second embodiment.

Incidentally, the configuration of the imaging optical system and the imaging device 105 in the present embodiment is not limited to the above configuration. For example, the configuration of the imaging optical system 102 and the imaging device 105, which is shown in FIG. 8, may be adopted. In the configuration of FIG. 8, the polarization beam splitting section 104 is located in the rear of the point spread function adding section 103. The light incident on the polarization beam splitting section 104 first enters the polarization control element 702 and then enters into the polarizer 701, followed by being captured by the imaging device 105. By controlling the polarization control element 702 so as to allow the polarizer 701 to transmit only the polarization beam condensed at the focal length $f_1$, the imaging device 105 is capable of capturing an image captured by the lens having the focal length $f_1$. By controlling the polarization control element 702 so as to allow the polarizer 701 to transmit only the polarization beam condensed at the focal length $f_2$, the imaging device 105 is capable of capturing an image captured by the lens having the focal length $f_2$.

Further, the polarization beam splitting section 104 is not limited to the combination of the polarizer and the polarization control element. The polarization beam splitting section 104 may be, for example, a rotary polarizer capable of controlling the direction of the polarization beam to be transmitted, or the like.

Third Embodiment

The present embodiment is different from the first and second embodiments in that a lens 203 is configured of a material with chirality. With this configuration, it is possible to relax lens mounting accuracy at the time of manufacture of the distance measurement device and to improve resistance to the rotation of the lens due to loosening of a lens holding section in use. Further, it is possible to cope even with a zoom function with the rotation of the lens.

Figure 9:
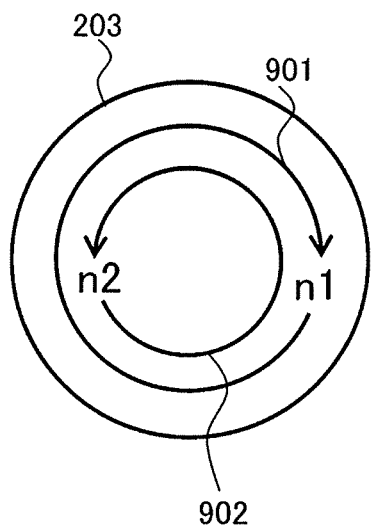
FIG. 9 is a diagram showing a configuration of a lens in a third embodiment.

FIG. 9 is a diagram showing an example of a configuration of the lens 203 in the present embodiment. Incidentally, the traveling direction of the incident light 201 is assumed to be a direction perpendicular to the paper surface. The material constituting the lens 203 is a material with chirality and indicates a different refractive index between right circular polarization and left circular polarization. For example, assuming that the refractive index with respect to the right circular polarization 901 is $n_1$, the refractive index with respect to the left circular polarization 902 is $n_2$, and the radius of curvature of the lens 203 is R, the focal length with respect to the right circular polarization becomes $f_1$ of the equation 1, and the focal length with respect to the left circular polarization becomes $f_2$ of the equation 2.

Therefore, an image (first polarization image) by the right circular polarization 901 and an image (second polarization image) by the left circular polarization 902 are split by the polarization beam splitting section 104 and then captured by the imaging device 105. It is thus possible to capture the two images different in blur amount in a manner similar to the first embodiment and 2. The polarization beam splitting section 104 may be, for example, a polarizer array in which a polarizer for transmitting only the right circular polarization and a polarizer for transmitting only the left circular polarization are arranged. There may be adopted a configuration in which a ¼-wavelength plate is disposed in front of the polarizer array described in the first embodiment, or there may be one arranged by combining the liquid crystal element and the polarizer described in the second embodiment.

With the above configuration, it is possible to measure the distance to the target object from the two images different in blur amount in a manner similar to the first embodiment and 2. Further, since the lens 203 of the present embodiment utilizes the birefringence with respect to the right and left circular polarizations, the image having the focal length $f_1$ and the image having the focal length $f_2$ are not captured with being mixed even when the lens 203 is rotated with the traveling direction of the incident light 201 as an axis. Therefore, the distance measurement accuracy is not reduced, the lens mounting accuracy at the time of manufacture of the distance measurement device can be relaxed, and the resistance to the rotation of the lens due to loosening of the lens holding section in use can be improved. Further, it is possible to cope even with a zoom function with the rotation of the lens.

Fourth Embodiment

The present embodiment is different from the first and second embodiments in that instead of using the birefringent lens in the point spread function adding section 103, polarization-dependent Fresnel zone plates 1001 and 1002 are used. With this configuration, since it is possible to add different blur amounts to two orthogonal polarized lights by using a thin and light Fresnel zone plate, a weight reduction of the device is made possible. Further, the difference between the blur amounts addable to the two orthogonal polarized lights has been limited by a difference in refractive index between the birefringent materials to be used in the first through third embodiments. However, with the configuration which uses the Fresnel zone plate, the combination of the focal lengths of the two orthogonal polarized lights can arbitrarily be selected, and the difference between the blur amounts to be added can be increased, thereby making it possible to improve the accuracy of the distance measurement.

Figure 10:
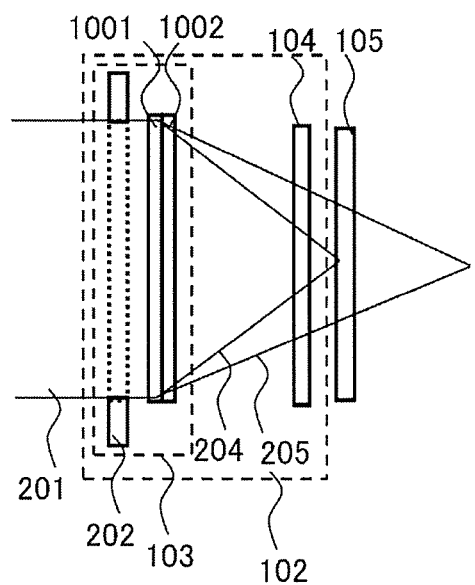
FIG. 10 is a diagram showing a configuration of an imaging optical system and an imaging device in a fourth embodiment.

FIG. 10 shows an example of a configuration of the imaging optical system 102 and the imaging device 105 in the present embodiment. The point spread function adding section 103 is configured to include an aperture stop 202, the polarization-dependent Fresnel zone plate 1001, and the polarization-dependent Fresnel zone plate 1002.

The Fresnel zone plate is a pattern in which a transparent ring belt and an opaque ring belt are alternately arranged concentrically, and serves to focus light. The radius $r_n$ of the nth ring belt of the Fresnel zone plate to focus the light of a wavelength λ at a focal length f is expressed by an equation 5. Therefore, a Fresnel zone plate of any focal length can be created depending on the design of spacing of each ring belt.

(Equation 5) $r_n = (n\lambda f)^{1/2}$ (5)

Figure 11A:
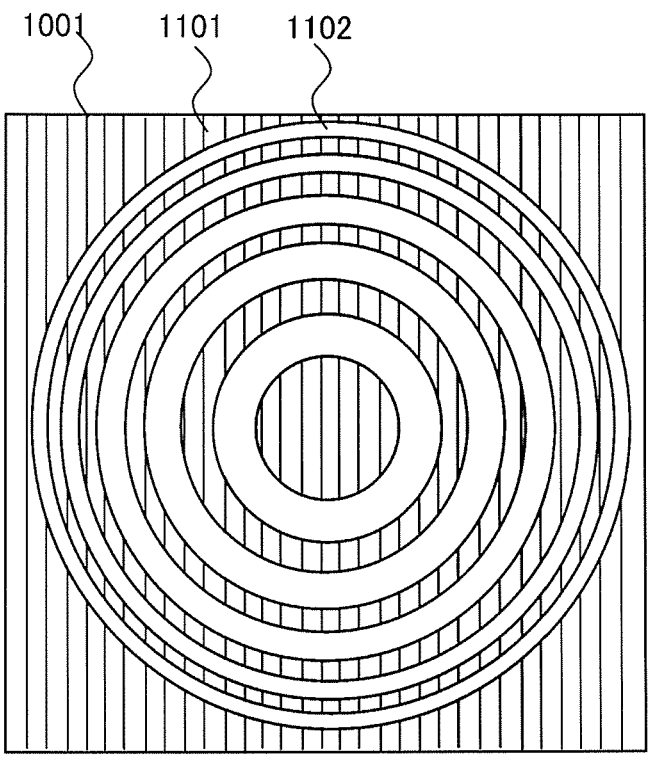
FIG. 11A is a diagram showing a configuration of a first polarization-dependent Fresnel zone plate in the fourth embodiment.

FIG. 11 shows an example of a configuration of the polarization-dependent Fresnel zone plate in the present embodiment. The polarization-dependent Fresnel zone plate 1001 of FIG. 11A is one in which an opaque ring belt 1101 which shields a first polarization beam 204 and transmits a second polarization beam 205, and a transparent ring belt 1102 which transmits both the first polarization beam 204 and the second polarization beam 205 are arranged concentrically. Since the polarization-dependent Fresnel zone plate 1001 is transparent with respect to the second polarization beam 205, it condenses only the first polarization beam 204.

Figure 11B:
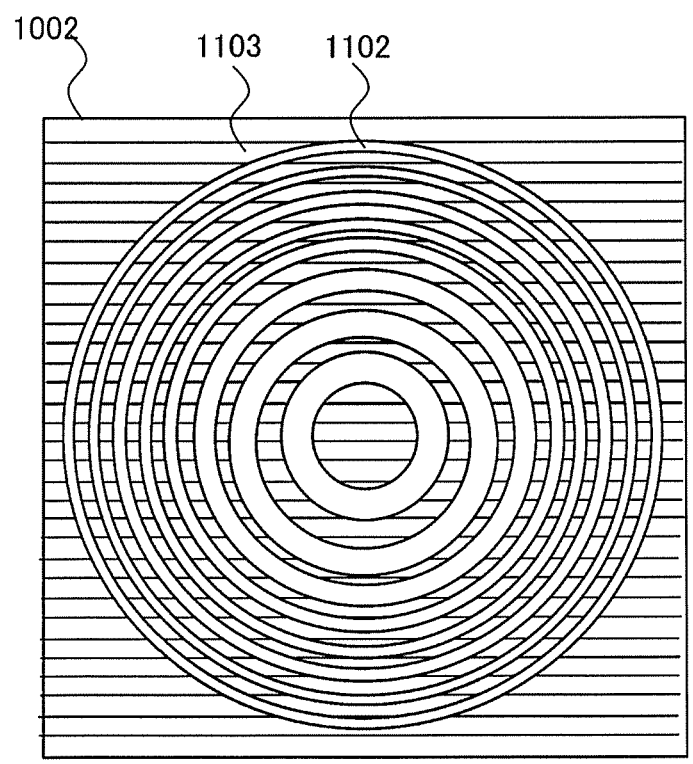
FIG. 11B is a diagram showing a configuration of a second polarization-dependent Fresnel zone plate in the fourth embodiment.

On the other hand, the polarization-dependent Fresnel zone plate 1002 of FIG. 11B is one in which an opaque ring belt 1103 which transmits the first polarization beam 204 and shields the second polarization beam 205, and a transparent ring belt 1102 which transmits both of the first polarization beam 204 and the second polarization beam 205 are arranged concentrically. Since the polarization-dependent Fresnel zone plate 1002 is transparent with respect to the first polarization beam 204, it condenses only the second polarization beam 205. The opaque ring belts 1101 and 1103 which respectively constitute the polarization-dependent Fresnel zone plates 1001 and 1002 utilize, for example, polarizers, photonic crystals, etc.

When the radius of the ring belt corresponding to the nth of the ring belts in the polarization-dependent Fresnel zone plate 1001 is set such that the focal length of the polarization-dependent Fresnel zone plate 1001 becomes $f_1$, the radius of the ring belt corresponding to the nth of the ring belts in the polarization-dependent Fresnel zone plate 1002 is set such that the focal length $f_2$ of the polarization-dependent Fresnel zone plate 1002 is taken, and the polarization-dependent Fresnel zone plate 1001 and the polarization-dependent Fresnel zone plate 1002 are bonded to each other and placed in the point spread function adding section 103, as shown in FIG. 10, the first polarization beam 204 is imaged at the focal length $f_1$, and the second polarization beam 205 is imaged at the focal length $f_2$. Therefore, two images different in blur amount can be captured by imaging the first polarization beam 204 and the second polarization beam 205 by the imaging device 105 after they are split by the polarization beam splitting section 104, and hence the distance measurement to the target object using the DFD method can be performed.

With the above configuration, since it is possible to add different blur amounts to two orthogonal polarized lights by using a thin and light Fresnel zone plate instead of the birefringent lens, a weight reduction of the device is made possible. Further, the difference between the blur amounts addable to the two orthogonal polarized lights has been limited by the difference in refractive index between the birefringent materials to be used in the first through third embodiments. However, with the configuration which uses the Fresnel zone plate, the combination of the focal lengths of the two orthogonal polarized lights can arbitrarily be selected, and the difference between the blur amounts to be added can be increased, thereby making it possible to improve the accuracy of the distance measurement.

Further, as for the polarization-dependent Fresnel zone plates 1001 and 1002, a phase-type polarization-dependent zone plate may be used in which instead of the opaque ring belts, birefringent ring belts to add a phase difference with a light beam transmitted through the transparent ring belts to only either the first polarization beam 204 and the second polarization beam 205 are arranged. With such a configuration, it is possible to suppress the loss of light intensity which occurs in the opaque ring belts of the polarization-dependent Fresnel zone plate.

Incidentally, in the present embodiment, as the polarization beam splitting method for the first polarization beam 204 and the second polarization beam 205 in the polarization beam splitting section 104, the method described in the first embodiment may be used, or the method described in the second embodiment may be used. Further, in the case where the method described in the second embodiment is used, the polarization beam splitting section 104 may be disposed in front of the point spread function adding section 103. Moreover, instead of using the two polarization-dependent Fresnel zone plates, one of them may be used as a normal imaging lens.

Fifth Embodiment

The present embodiment is different from the first through fourth embodiments in that using a polarization-dependent aperture; two orthogonal polarized lights are narrowed by apertures different in size to thereby add different blur amounts to the two orthogonal polarized lights. This configuration leads to reductions in thickness, weight and cost of a point spread function adding section 103. Further, simply by changing the diameters of an aperture part 202a and a polarization-dependent aperture part 1201a, it is possible to arbitrarily polarize the difference in blur amount between images of a first polarization beam 204 and a second polarization beam 205, and it is possible to control the distance measurement accuracy according to purposes of use.

Figure 12:
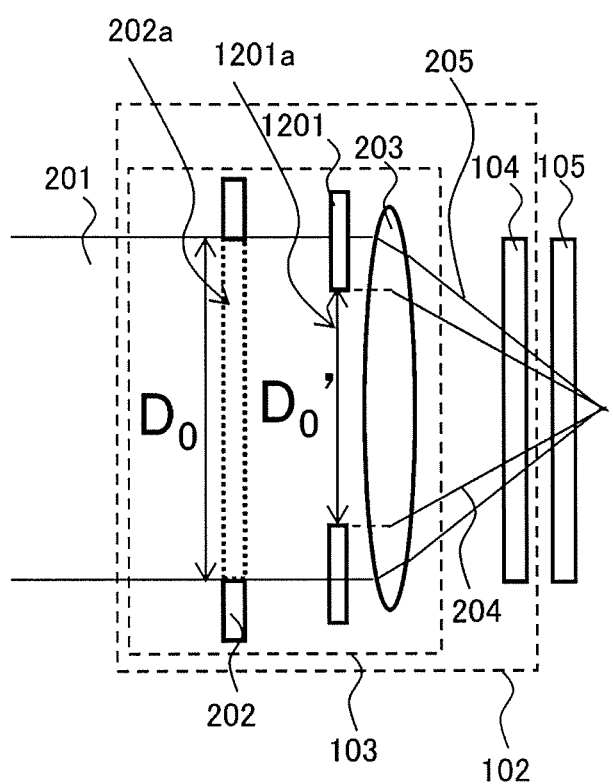
FIG. 12 is a diagram showing a configuration of an imaging optical system and an imaging device in a fifth embodiment.

FIG. 12 shows an example of a configuration of an imaging optical system 102 and an imaging device 105 in the present embodiment. The point spread function adding section 103 is configured to include an aperture stop 202, a polarization-dependent aperture stop 1201, and a lens 203. The polarization-dependent aperture stop 1201 transmits both the first polarization beam 204 and the second polarization beam 205 within a range of a diameter $D_0'$ from the center, for example, but in terms of the incident light thereoutside, the circular polarization-dependent aperture part 1201a which shields the first polarization beam 204 and transmits the second polarization beam 205 is formed. Incidentally, an aperture diameter $D_0'$ of the polarization-dependent aperture part 1201a is assumed to be smaller than an aperture diameter $D_0$ of the aperture part 202a.

Further, the lens 203 does not require the use of the birefringent material, and functions as a lens having a focal distance f with respect to both of the first polarization beam 204 and the second polarization beam 205.

Of the incident light 201 which is incident on the imaging optical system 102, light of the first polarization beam 204 is narrowed down to the aperture diameter $D_0$ at the aperture part 202a and then narrowed down to the aperture diameter $D_0'$ by the polarization-dependent aperture part 1201a. Thereafter, the first polarization beam 204 is condensed by the lens 203 and transmitted through the polarization beam splitting section 104, followed by being captured by the imaging device 105. A diameter $D_1$ of a point spread function of the first polarization beam 204 can be represented by an equation 6 when using $D_0'$, a distance u between the lens 203 and a target object, a distance s between the lens 203 and the imaging device 105, and f.

On the other hand, of the incident light 201 which is incident on the imaging optical system 102, light of the second polarization beam 205 is narrowed down to the aperture diameter $D_0$ at the aperture part 202a and then transmitted through the polarization-dependent aperture part 1201a, but the aperture diameter does not change. Thereafter, the second polarization beam 205 is condensed by the lens 203 and transmitted through the polarization beam splitting section 104, followed by being captured by the imaging device 105. A diameter $D_2$ of a point spread function of the second polarization beam 205 can be represented by an equation 7 when using $D_0$, the distance u between the lens 203 and the target object, the distance s between the lens 203 and the imaging device 105, and the focal length f of the lens 203.

(Equation 6) $D_1 = sD_0'(1/f - 1/u - 1/s)$     (6)

(Equation 7) $D_2 = sD_0(1/f - 1/u - 1/s)$     (7)

With the adoption of the above configuration, the two images different in blur amount can be captured by imaging the first polarization beam 204 and the second polarization beam 205 by the imaging device 105 after splitting the first polarization beam 204 and the second polarization beam 205 by the polarization beam splitting section 104. It is therefore possible to perform the distance measurement to the target object using the DFD method. In the present embodiment, since the polarization-dependent aperture stop 1201 using the circular aperture by the polarizer is used instead of the birefringent lens used in the first embodiment to 3, the point spread function adding section 103 can be made thin and light. Further, the polarization-dependent aperture stop 1201 of the present embodiment is a simpler structure than the polarization-dependent Fresnel zone plate of the fourth embodiment and is hence capable of being reduced in manufacturing cost. Furthermore, as for the aperture stop 202, the so-called mechanical aperture stop to open and close the movable blade by using the already-described aperture stop driving section 206 is used, and the aperture part 202a is formed as a variable aperture, whereby the difference in blur amount between the images of the first polarization beam 204 and the second polarization beam 205 can arbitrarily be polarized simply by changing the size of the aperture diameter $D_0$, and the distance measurement accuracy can be controlled according to the purposes of use.

The above-described respective embodiments are not intended to limit the present invention, and various modifications not departing from the spirit of the present invention are intended to be included in the present invention. For example, the wavelength of the imaging light is not limited to visible light. It may be an electromagnetic wave longer in wavelength than infrared, or may be an electromagnetic wave shorter in wavelength than ultraviolet light. Also, the combination of the point spread function adding section and the polarization beam splitting section is not limited to the above either. Further, the processing order described in the above-described flowcharts is an example, and embodiments in which processing capable of obtaining the same operative effect even if the processing order is exchanged is interchanged before and after the processing are also included in the present invention. Moreover, the application examples of the present invention described with reference to FIGS. 15 through 21 can be applied even to not only the distance measurement device according to the first embodiment, but also the distance measurement devices according to the second to fifth embodiments.

REFERENCE SIGNS LIST

101 . . . distance measurement device, 102 . . . imaging optical system, 103 . . . point spread function adding section, 104 . . . polarization beam splitting section, 105 . . . imaging device, 106 . . . image processing section, 107 . . . distance measurement section, 108 . . . display image forming section, 201 . . . incident light, 202 . . . aperture, 203 . . . lens, 701 . . . polarizer, 702 . . . polarization control element, 1001 . . . polarization-dependent Fresnel zone plate, 1002 . . . polarization-dependent Fresnel zone plate, 1201 . . . polarization-dependent aperture, 1501 . . . image display device, 1502 . . . image display section, 1503 . . . audio input section, 1504 . . . input switch, 2101 . . . camera holding section.

The invention claimed is:

1. A distance measurement device which measures, based on a plurality of images, a distance to a target to be imaged captured into the corresponding images, comprising:

an imaging optical system;

an imaging device which images incident light from the imaging optical system; and a distance measurement section which measures the distance from the imaging device to the target to be imaged on the basis of the plurality of images captured by the imaging device, wherein the imaging optical system includes a polarization beam splitting section which splits a first polarization beam having a first polarization direction and a second polarization beam having a second polarization direction substantially orthogonal to the first polarization direction and allows the polarization beam splitting section to be incident on the imaging device, wherein the imaging device receives the first polarization beam to capture a first polarization image, and receives the second polarization beam to capture a second polarization image, wherein the distance measurement section measures the distance to the target to be imaged on the basis of the first polarization image and the second polarization image, wherein the imaging optical system further includes a point spread function adding section which adds a first point spread function to the first polarization beam and adds a second point spread function different from the first point spread function to the second polarization beam, wherein the point spread function adding section includes a lens constituted of a birefringent material having a different refractive index with respect to the first polarization beam and the second polarization beam respectively, wherein the lens functions as a lens having a focal length different with respect to the first polarization beam and the second polarization beam, wherein the lens is consisted of a material with chirality, which exhibits birefringence between left circular polarization and right circular polarization, and wherein the first polarization beam is one of the left and right circular polarizations of the lens, and the second polarization beam is the other of the left and right circular polarizations of the lens.

2. The distance measurement device according to claim 1, wherein the polarization beam splitting section has a polarizer array in which at least one or more first polarizers and at least one or more second polarizers are arranged,
wherein the first polarizer is a polarizer which transmits the first polarization beam and shields the second polarization beam,
wherein the second polarizer is a polarizer which transmits the second polarization beam and shields the first polarization beam, and
wherein the imaging device has a part of pixels receiving the first polarization beam transmitted through the first polarizer, and the remaining pixels receiving the second polarization beam transmitted through the second polarizer, at one imaging.

3. The distance measurement device according to claim 1, wherein the polarization beam splitting section includes:
a polarizer which transmits the first polarization beam and the second polarization beam contained in the incident light separately; and
a polarization control element which switches toward the imaging device whether to transmit either the first polarization beam or the second polarization beam toward the imaging device, and
wherein the imaging device captures the first polarization image when the polarization control element controls the polarizer to transmits the first polarization beam, and captures the second polarization image when the polarization control element controls the polarizer to transmit the second polarization beam.

4. The distance measurement device according to claim 1, wherein the distance measurement section measures the distance to the target to be imaged from the difference between the first point spread function and the second point spread function.

5. A distance measurement device which measures, based on a plurality of images, a distance to a target to be imaged captured into the corresponding images, comprising:
an imaging optical system;
an imaging device which images incident light from the imaging optical system; and
a distance measurement section which measures the distance from the imaging device to the target to be imaged on the basis of the plurality of images captured by the imaging device,
wherein the imaging optical system includes a polarization beam splitting section which splits a first polarization beam having a first polarization direction and a second polarization beam having a second polarization direction substantially orthogonal to the first polarization direction and allows the polarization beam splitting section to be incident on the imaging device,
wherein the imaging device receives the first polarization beam to capture a first polarization image, and receives the second polarization beam to capture a second polarization image,
wherein the distance measurement section measures the distance to the target to be imaged on the basis of the first polarization image and the second polarization image,
wherein the imaging optical system further includes a point spread function adding section which adds a first point spread function to the first polarization beam and adds a second point spread function different from the first point spread function to the second polarization beam,
wherein the point spread function adding section includes:
a first Fresnel zone plate in which a polarizer which shields the first polarization beam and transmits the second polarization beam, and a transmissive region which transmits the first polarization beam and the second polarization beam are arranged concentrically; and
a second Fresnel zone plate in which a polarizer which transmits the first polarization beam and shields the second polarization beam, and a transmissive region which transmits the first polarization beam and the second polarization beam are arranged concentrically, and
wherein a focal length of the first Fresnel zone plate and a focal length of the second Fresnel zone plate are different.

6. The distance measurement device according to claim 5, wherein the polarization beam splitting section has a polarizer array in which at least one or more first polarizers and at least one or more second polarizers are arranged,
wherein the first polarizer is a polarizer which transmits the first polarization beam and shields the second polarization beam,
wherein the second polarizer is a polarizer which transmits the second polarization beam and shields the first polarization beam, and
wherein the imaging device has a part of pixels receiving the first polarization beam transmitted through the first polarizer, and the remaining pixels receiving the second polarization beam transmitted through the second polarizer, at one imaging.

7. The distance measurement device according to claim 5, wherein the polarization beam splitting section includes:
a polarizer which transmits the first polarization beam and the second polarization beam contained in the incident light separately; and
a polarization control element which switches toward the imaging device whether to transmit either the first polarization beam or the second polarization beam toward the imaging device, and
wherein the imaging device captures the first polarization image when the polarization control element controls the polarizer to transmits the first polarization beam, and captures the second polarization image when the polarization control element controls the polarizer to transmit the second polarization beam.

8. The distance measurement device according to claim 5, wherein the distance measurement section measures the distance to the target to be imaged from the difference between the first point spread function and the second point spread function.

9. A distance measurement device which measures, based on a plurality of images, a distance to a target to be imaged captured into the corresponding images, comprising:
an imaging optical system;
an imaging device which images incident light from the imaging optical system; and
a distance measurement section which measures the distance from the imaging device to the target to be imaged on the basis of the plurality of images captured by the imaging device,
wherein the imaging optical system includes a polarization beam splitting section which splits a first polarization beam having a first polarization direction and a second polarization beam having a second polarization direction substantially orthogonal to the first polarization direction and allows the polarization beam splitting section to be incident on the imaging device, wherein the imaging device receives the first polarization beam to capture a first polarization image, and receives the second polarization beam to capture a second polarization image, wherein the distance measurement section measures the distance to the target to be imaged on the basis of the first polarization image and the second polarization image, wherein the imaging optical system further includes a point spread function adding section which adds a first point spread function to the first polarization beam and adds a second point spread function different from the first point spread function to the second polarization beam, and wherein the point spread function adding section is formed with an aperture part and has a non-aperture part including a polarization-dependent aperture stop to allow shielding or transmission to be performed according to the polarization direction, and either the first polarization beam or the second polarization beam is transmitted through the aperture part and the non-aperture part, and the other is transmitted through only the aperture part and shielded at the non-aperture part.

10. The distance measurement device according to claim 9, wherein the polarization beam splitting section has a polarizer array in which at least one or more first polarizers and at least one or more second polarizers are arranged, wherein the first polarizer is a polarizer which transmits the first polarization beam and shields the second polarization beam, wherein the second polarizer is a polarizer which transmits the second polarization beam and shields the first polarization beam, and wherein the imaging device has a part of pixels receiving the first polarization beam transmitted through the first polarizer, and the remaining pixels receiving the second polarization beam transmitted through the second polarizer, at one imaging.

11. The distance measurement device according to claim 9, wherein the polarization beam splitting section includes:
a polarizer which transmits the first polarization beam and the second polarization beam contained in the incident light separately; and
a polarization control element which switches toward the imaging device whether to transmit either the first polarization beam or the second polarization beam toward the imaging device, and wherein the imaging device captures the first polarization image when the polarization control element controls the polarizer to transmits the first polarization beam, and captures the second polarization image when the polarization control element controls the polarizer to transmit the second polarization beam.

12. The distance measurement device according to claim 9, wherein the distance measurement section measures the distance to the target to be imaged from the difference between the first point spread function and the second point spread function.

13. A head-mounted display device comprising:
a distance measurement device which measures, based on a plurality of images, a distance to a target to be imaged captured into the corresponding images, wherein the distance measurement device comprises:
an imaging optical system;
an imaging device which images incident light from the imaging optical system; and
a distance measurement section which measures the distance from the imaging device to the target to be imaged on the basis of the plurality of images captured by the imaging device, wherein the imaging optical system includes a polarization beam splitting section which splits a first polarization beam having a first polarization direction and a second polarization beam having a second polarization direction substantially orthogonal to the first polarization direction and allows the polarization beam splitting section to be incident on the imaging device, wherein the imaging device receives the first polarization beam to capture a first polarization image, and receives the second polarization beam to capture a second polarization image, and wherein the distance measurement section measures the distance to the target to be imaged on the basis of the first polarization image and the second polarization image, a control section which acquires an operation signal from the distance measurement device to perform operation control, wherein the distance measurement device extracts from the first polarization image and the second polarization image obtained by being captured each finger of the hand of a user being the target to be imaged in first imaging, feature points of the finger to obtain three-dimensional coordinates, extracts feature points of the finger from the first polarization image and the second polarization image obtained in second imaging to be performed after the first imaging to obtain three-dimensional coordinates, calculates movement amounts of the feature points from the difference between the three-dimensional coordinates of the feature points obtained in the first imaging and the three-dimensional coordinates of the feature points obtained in the second imaging, and outputs the operation signal including the movement amounts to the control section, and wherein the control section executes operation control based on the operation signal.

14. A mobile information terminal comprising:
a distance measurement device which measures, based on a plurality of images, a distance to a target to be imaged captured into the corresponding images, wherein the distance measurement device comprises:
an imaging optical system;
an imaging device which images incident light from the imaging optical system; and
a distance measurement section which measures the distance from the imaging device to the target to be imaged on the basis of the plurality of images captured by the imaging device, wherein the imaging optical system includes a polarization beam splitting section which splits a first polarization beam having a first polarization direction and a second polarization beam having a second polarization direction substantially orthogonal to the first polarization direction and allows the polarization beam splitting section to be incident on the imaging device, wherein the imaging device receives the first polarization beam to capture a first polarization image, and receives the second polarization beam to capture a second polarization image, and wherein the distance measurement section measures the distance to the target to be imaged on the basis of the first polarization image and the second polarization image,
a control section which acquires an operation signal from the distance measurement device to perform operation control,
wherein the distance measurement device extracts from the first polarization image and the second polarization image obtained by being captured each finger of the hand of the user being the target to be imaged in first imaging, feature points of the finger to obtain three-dimensional coordinates, extracts feature points of the finger from the first polarization image and the second polarization image obtained in second imaging to be performed after the first imaging to obtain three-dimensional coordinates, calculates movement amounts of the feature points from the difference between the three-dimensional coordinates of the feature points obtained in the first imaging and the three-dimensional coordinates of the feature points obtained in the second imaging, and outputs the operation signal including the movement amounts to the control section, and
wherein the control section executes operation control based on the operation signal.

15. An image display device comprising:
a distance measurement device which measures, based on a plurality of images, a distance to a target to be imaged captured into the corresponding images, wherein the distance measurement device comprises:
an imaging optical system;
an imaging device which images incident light from the imaging optical system; and
a distance measurement section which measures the distance from the imaging device to the target to be imaged on the basis of the plurality of images captured by the imaging device,
wherein the imaging optical system includes a polarization beam splitting section which splits a first polarization beam having a first polarization direction and a second polarization beam having a second polarization direction substantially orthogonal to the first polarization direction and allows the polarization beam splitting section to be incident on the imaging device,
wherein the imaging device receives the first polarization beam to capture a first polarization image, and receives the second polarization beam to capture a second polarization image, and
wherein the distance measurement section measures the distance to the target to be imaged on the basis of the first polarization image and the second polarization image,
an image display section which displays an image,
wherein the distance measurement device extracts from the first polarization image and the second polarization image obtained by being captured each finger of the hand of the user being the target to be imaged in first imaging, feature points of the finger to obtain three-dimensional coordinates, extracts feature points of the finger from the first polarization image and the second polarization image obtained in second imaging to be performed after the first imaging to obtain three-dimensional coordinates, and calculates movement amounts of the feature points from the difference between the three-dimensional coordinates of the feature points obtained in the first imaging and the three-dimensional coordinates of the feature points obtained in the second imaging, and
wherein the image display section updates a display image reflecting the movement amounts of the feature points.

16. A surroundings monitoring system for a vehicle comprising:
a distance measurement device which measures, based on a plurality of images, a distance to a target to be imaged captured into the corresponding images, wherein the distance measurement device comprises:
an imaging optical system;
an imaging device which images incident light from the imaging optical system; and
a distance measurement section which measures the distance from the imaging device to the target to be imaged on the basis of the plurality of images captured by the imaging device,
wherein the imaging optical system includes a polarization beam splitting section which splits a first polarization beam having a first polarization direction and a second polarization beam having a second polarization direction substantially orthogonal to the first polarization direction and allows the polarization beam splitting section to be incident on the imaging device,
wherein the imaging device receives the first polarization beam to capture a first polarization image, and receives the second polarization beam to capture a second polarization image, and
wherein the distance measurement section measures the distance to the target to be imaged on the basis of the first polarization image and the second polarization image,
a control section which receives the input of information about the speed of a vehicle and determines a traveling mode of the vehicle,
wherein the imaging device included in the distance measurement device captures the first polarization image and the second polarization image with an object lying in the periphery of the vehicle as the target to be imaged, and the distance measurement section changes a distance range measured according to the traveling mode and measures the distance to the object on the basis of the first polarization image and the second polarization image.

17. A distance measurement method of measuring a distance to a target to be imaged from the difference between a point spread function of a first polarization image obtained by imaging a first polarization beam contained in incident light, and a point spread function of a second polarization image obtained by imaging a second polarization beam contained in the incident light, comprising:
an image capturing step for capturing the first polarization image and the second polarization image by using an imaging device;
a point spread function extracting step for extracting a point spread function from each of the first polarization image and the second polarization image;
a distance information calculating step for calculating distance information from the difference between the point spread functions; and
an aperture diameter changing step for changing an aperture diameter of an imaging optical system contained in a distance measurement device for executing the distance measurement method to be the size of a point spread function appropriate for distance measurement.

18. A distance measurement method of measuring a distance to a target to be imaged from the difference between a point spread function of a first polarization image obtained by imaging a first polarization beam contained in incident light, and a point spread function of a second polarization image obtained by imaging a second polarization beam contained in the incident light, comprising:
  an image capturing step for capturing the first polarization image and the second polarization image by using an imaging device;
  a point spread function extracting step for extracting a point spread function from each of the first polarization image and the second polarization image;
  a distance information calculating step for calculating distance information from the difference between the point spread functions;
  a traveling mode determining step for determining a traveling state of a mobile mechanical device equipped with a distance measurement device for performing the distance measurement method; and
  a distance range determining step for determining a distance range in calculating distance information from the difference between the point spread functions on the basis of the determination result in the traveling mode determining step.

* * * * *